US012094679B2

(12) United States Patent
Tardin

(10) Patent No.: US 12,094,679 B2
(45) Date of Patent: Sep. 17, 2024

(54) SYSTEMS AND METHODS FOR CREATING AN ELECTRON COIL MAGNET

(71) Applicant: VACON Ltd., Haniel (IL)

(72) Inventor: Lior Tardin, Haniel (IL)

(73) Assignee: VACON Ltd., Haniel (IL)

( * ) Notice: Subject to any disclaimer, the term of this patent is extended or adjusted under 35 U.S.C. 154(b) by 97 days.

(21) Appl. No.: 17/799,327

(22) PCT Filed: Feb. 23, 2021

(86) PCT No.: PCT/IB2021/051525
§ 371 (c)(1),
(2) Date: Aug. 12, 2022

(87) PCT Pub. No.: WO2021/171183
PCT Pub. Date: Sep. 2, 2021

(65) Prior Publication Data

US 2023/0093623 A1 Mar. 23, 2023

Related U.S. Application Data

(60) Provisional application No. 62/980,453, filed on Feb. 24, 2020.

(51) Int. Cl.
*H01J 21/18* (2006.01)
*H01J 19/28* (2006.01)
*H01J 19/54* (2006.01)

(52) U.S. Cl.
CPC .............. *H01J 21/18* (2013.01); *H01J 19/28* (2013.01); *H01J 19/54* (2013.01)

(58) Field of Classification Search
CPC ........... H01J 37/3211; H01P 5/02; H05H 1/46
See application file for complete search history.

(56) References Cited

U.S. PATENT DOCUMENTS

| | | | |
|---|---|---|---|
| 4,392,078 A | 7/1983 | Noble et al. | |
| 2003/0062129 A1 | 4/2003 | Ni | |
| 2009/0184243 A1 | 7/2009 | Kawaski et al. | |
| 2010/0032587 A1 | 2/2010 | Hosch et al. | |
| 2010/0129272 A1 | 5/2010 | Fujuta et al. | |

(Continued)

FOREIGN PATENT DOCUMENTS

| | | | |
|---|---|---|---|
| CN | 105451972 A * | 3/2016 | ........... B29B 15/122 |
| WO | 2004057740 A1 | 7/2004 | |

OTHER PUBLICATIONS https://tinyurl.com/y55nem4g Published Apr. 21, 2015.
International Search Report and Written Opinion in related PCT application PCT/IB2021/051525 dated Jun. 11, 2021.

*Primary Examiner* — Abdullah A Riyami
*Assistant Examiner* — Syed M Kaiser
(74) *Attorney, Agent, or Firm* — Nathan & Associates; Menachem Nathan

(57) ABSTRACT

A magnet system comprising: a supplied magnetic field producer configured for creating a supplied magnetic field (SMF) or a supplied radial electric field producer configured for creating a supplied radial electric field (SREF); and an electron gun positioned so as to fire electrons into the SMF or the SREF such that the electrons fired from the electron gun form an electron coil, wherein the electron coil creates a self-generated magnetic field (SGMF), wherein the electron coil is formed in a vacuum.

17 Claims, 31 Drawing Sheets

(56) References Cited

U.S. PATENT DOCUMENTS

| | | | |
|---|---|---|---|
| 2010/0327785 A1 | 12/2010 | Crewson et al. |
| 2013/0259198 A1 | 10/2013 | Alezra et al. |
| 2016/0078992 A1 | 3/2016 | Barnett |
| 2018/0159444 A1 | 6/2018 | Sperry |

* cited by examiner

SYSTEMS AND METHODS FOR CREATING AN ELECTRON COIL MAGNET

CROSS REFERENCE TO RELATED APPLICATIONS

This is a 371 application from international patent application PCT/IB2021/051525 filed on Feb. 23, 2021, which claims priority from U.S. Provisional Patent Application No. 62/980,453 filed on Feb. 24, 2020, which is expressly incorporated herein by reference in its entirety.

FIELD

Embodiments disclosed herein relate to systems and methods for creating electron coil magnets in a vacuum.

BACKGROUND

Many electrical devices rely on the use of a magnetic field generated by an electromagnet that forms a component of the device. Examples of such electrical devices include motors, generators, electromechanical solenoids, relays, loudspeakers, hard disks, MRI scanners, NMR scanners, scientific instruments, magnetic separation equipment, and so forth. Electromagnets are typically formed by running a current through a coiled conductor. If higher magnetic flux densities (MFD), sometimes referred to as magnetic strengths, are desired then the current through the coil and/or the number of turns inside the coil must be increased.

However, increasing the current to the coil increases the heat generated by the conductor of the coil due to resistance of the conductor. One strategy to increase the current without overheating the coil conductor is to increase the coil conductor thickness, to thereby lower the resistance of the conductor. Given a limited space in which a coil resides, a thicker conductor will mean a decrease in the number of windings/turns in the same space, leading to decreased MFD. Therefore, there exists a limitation on how high a current can flow through many dense coil turns in a conductor coil and therefore a practical limitation on the strength of electromagnet that can be realized.

Another strategy to overcome resistance-induced heat is cooling of the coil. The coil can be sufficiently cooled such that the conductor reaches zero resistance to the flow of electric current thus becoming a superconductor. Sufficient cooling could require use of liquid helium to a temperature of 4° K (−269° C.). The MFD of superconducting electromagnets is therefore limited by the extensive cooling systems required, the related electricity costs, related maintenance complexity, and cooling system size requirements. Despite these limitations, electromagnets constructed with superconductors are used due to their high MFDs. In the example of MRI cited above, a significant component of the MRI scanner is the electromagnet and superconducting electromagnets are commonly used. Thus, this approach to reducing resistance is suitable in only very specific, very costly applications.

A further limitation of large electromagnets is the need for a magnetically permeable metallic core. These add further weight and increase the size of electromagnets.

SUMMARY

Exemplary embodiments disclosed herein relate to a system for creating an electron coil magnet without wires in a vacuum. As described further herein, the disclosed system guides electrons into a helical paths, herein termed an "electron coil" with densely packed "windings". The term "winding" as used herein refers to a complete helical path traced by a free electron or group of electrons. In some embodiments, the helical trajectory of the free electrons may be brought about by the electrons being fired in a plane that is substantially perpendicular to the plane of an externally supplied magnetic field (SMF), in a direction that is substantially perpendicular to the direction of the magnetic field lines. In some embodiments electrons are fired in substantially the same plane as an externally supplied radial electric field (SREF) in a direction that is substantially perpendicular to the direction of the electric field lines. In both embodiments, the movement of electrons in a coiled path is thus achieved without a wire conductor guiding the coiled path. A very high density of windings is possible since each winding only occupies a tiny space in the order of several electrons wide. In some embodiments, the equivalent of over 500,000 windings per meter, are supported.

The large number of windings thus creates a magnet with large magnetic flux density (MFD). In some embodiments, the magnetic flux may be concentrated primarily at the core of the electron coil. In some embodiments, the magnetic flux may extend outwards from the core. Magnetic flux density is further strengthened as a high current can pass through the electron coil, resulting in magnets with large MFDs, in the order of several Tesla.

The MFD of the presently disclosed "electron coil magnet system" (ECMS) is not constrained in the same way as electromagnets formed from coiled wires or superconducting electromagnets.

In some embodiments, no metallic core is required by the ECMS, thus reducing the weight and size of the ECMS.

In some embodiments, the ECMS includes a high permeability metallic core.

In some embodiments, a controllable ECMS includes means for controlling the generated MFD, enabling, for example, switching of magnetic polarity or control of field density.

As used herein the term "power supply" refers to a voltage source capable of supplying the load to which it is connected. In some embodiments, a power supply is a regulated voltage source.

In some embodiments, a magnet system includes: a supplied magnetic field producer configured for creating a supplied magnetic field (SMF) or a supplied radial electric field producer configured for creating a supplied radial electric field (SREF); and an electron gun positioned so as to fire electrons into the SMF or the SREF such that the electrons fired from the electron gun form an electron coil formed in a vacuum, wherein the electron coil creates a self-generated magnetic field (SGMF).

In some embodiments, the SMF producer comprises fixed magnets. In some embodiments, the SMF producer comprises Helmholtz coils. In some embodiments, the SREF producer comprises an outer cylinder and an inner cylinder. In some embodiments, the system further includes one or more shaping electrode clusters. In some embodiments, each shaping electrode cluster includes a plurality of conducting layers and one or more dielectric layers. In some embodiments, the system further includes one or more repelling plates for repulsion of fired electrons away from the repelling plates.

In some embodiments, the system further includes a controller and a second electron gun, wherein the controller is configured for changing the magnetic polarity of the SGMF. In some embodiments, the system further includes a vacuum container for containing the vacuum. In some embodiments, the system further includes a collector electrode for collection of fired electrons.

In some embodiments, the system further includes a shielding container. In some embodiments, the electron gun emission mechanism is one of thermionic, photocathode, field emission, or plasma source. In some embodiments, the electron gun comprises an electron gun output. In some embodiments, the electron gun output is positioned within the SMF or the SREF. In some embodiments, the electron gun output is positioned outside of the SMF or the SREF.

In some embodiments, the electron gun comprises one or more of an electron velocity control, an angle control and/or a focus control. In some embodiments, the controller can control a parameter selected from the list consisting of an angle of insertion of the electrons from electron gun, an insertion velocity of the electrons from electron gun, a focus control of the electron gun and a combination thereof. In some embodiments, the system further includes a metallic core, wherein the metallic core comprises one or more sections. In some embodiments, the metallic core comprises a material with high magnetic permeability and/or a high magnetic saturation level. In some embodiments, the metallic core comprises an alloy such as mu-metal.

In some embodiments, the system is configured for use in one or more of: MRI scanners, radio transceivers, electromagnetic motors, electromagnetic generators, electromechanical solenoids, transformer primary windings transformer secondary winding, relays, loudspeakers, hard disks, scientific instruments, or magnetic separation equipment. In some embodiments, the vacuum container comprises a metal. In some embodiments, the vacuum container is electrically connected to one of a power supply or negative charge supply. In some embodiments, the negative charge supply is a Van de Graaff generator.

In some embodiments, a method for creating a self-generated magnetic field includes: providing the supplied magnetic field producer configured for creating a supplied magnetic field (SMF) or the supplied radial electric field producer configured for creating a supplied radial electric field (SREF) as described above; providing the electron gun positioned so as to fire electrons into the SMF or the SREF as described above; and firing the electrons into the SMF or the SREF within a vacuum to create an electron coil, wherein the electron coil creates a self-generated magnetic field.

The details of one or more implementations are set forth in the accompanying drawings and the description below. Other features will be apparent from the description and drawings, and from the claims.

BRIEF DESCRIPTION OF THE DRAWINGS

Aspects, embodiments and features disclosed herein will become apparent from the following detailed description when considered in conjunction with the accompanying drawings. Like elements may be numbered with like numerals in different figures in which.

DETAILED DESCRIPTION

Figure 1A:
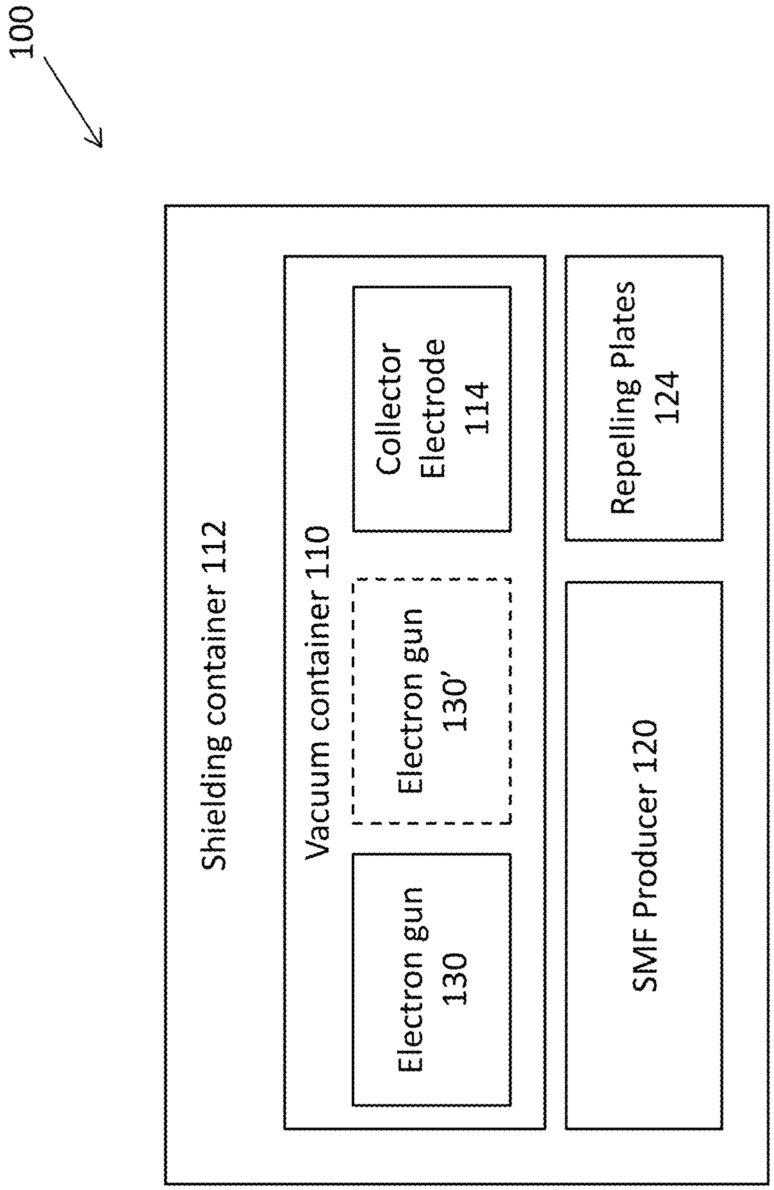
FIGS. 1A-1D are schematic block diagrams showing the primary components of an electron coil magnet system according to some embodiments.

Reference will now be made in detail to non-limiting examples of an electron coil magnet system, examples of which are illustrated in the accompanying drawings. The examples are described below by referring to the drawings, wherein like reference numerals refer to like elements. When like reference numerals are shown, corresponding description(s) are not repeated, and the interested reader is referred to the previously discussed figure(s) for a description of the like element(s).

Exemplary embodiments disclosed herein relate to an electron coil magnet system. The ECMS creates an electron coil including windings without a wire conductor. The ECMS enables generation of large magnetic flux densities (MFD), and thus may be used as a magnet.

Figure 1B:
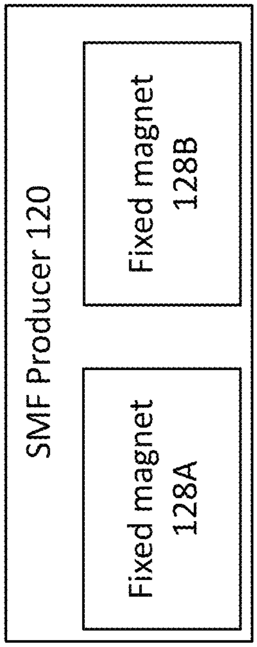
Figure 1C:
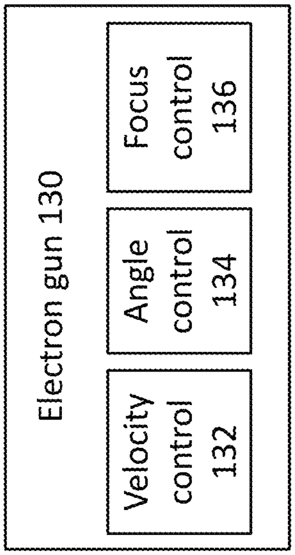
Figure 1D:
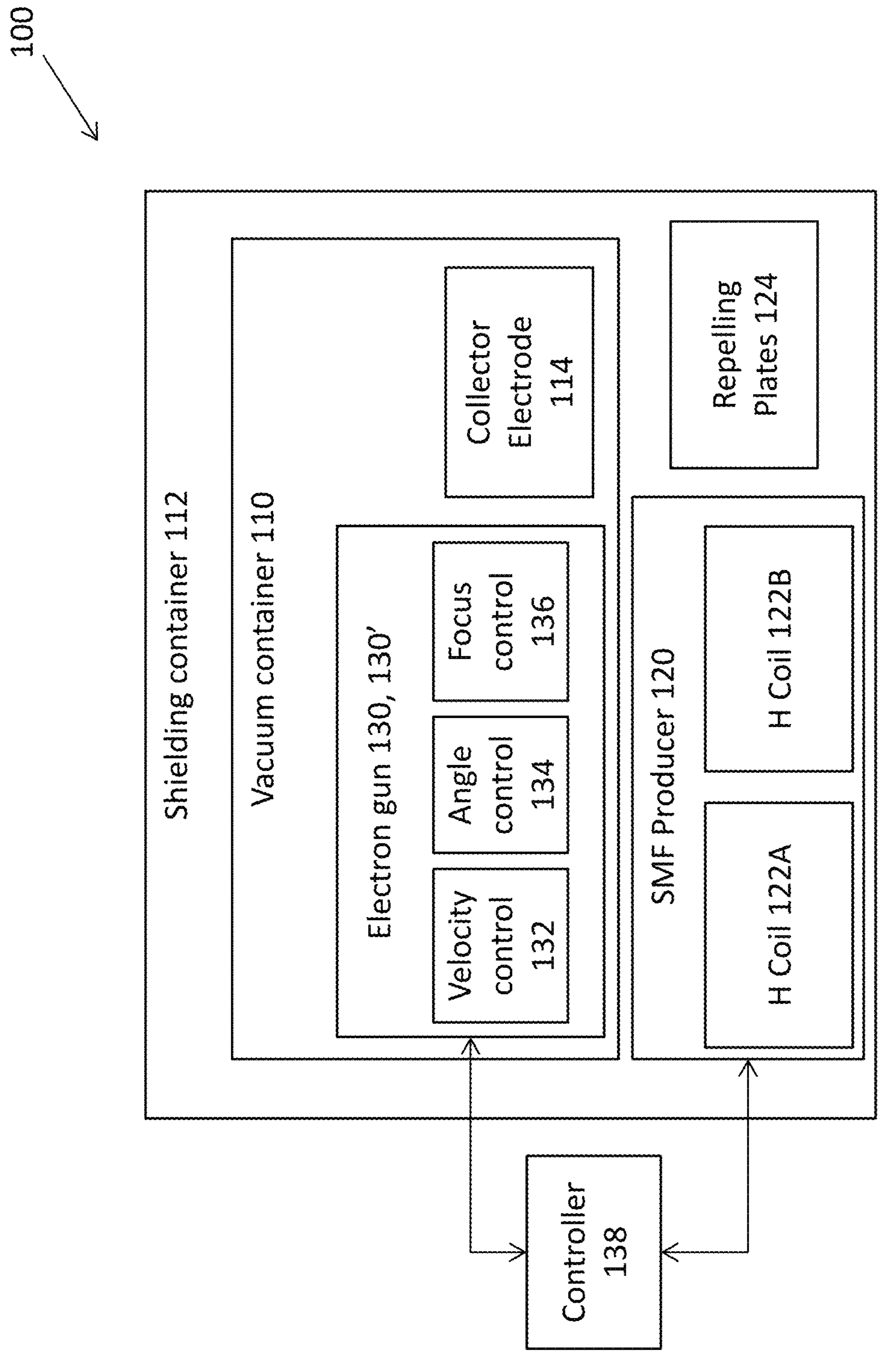
Figure 1E:
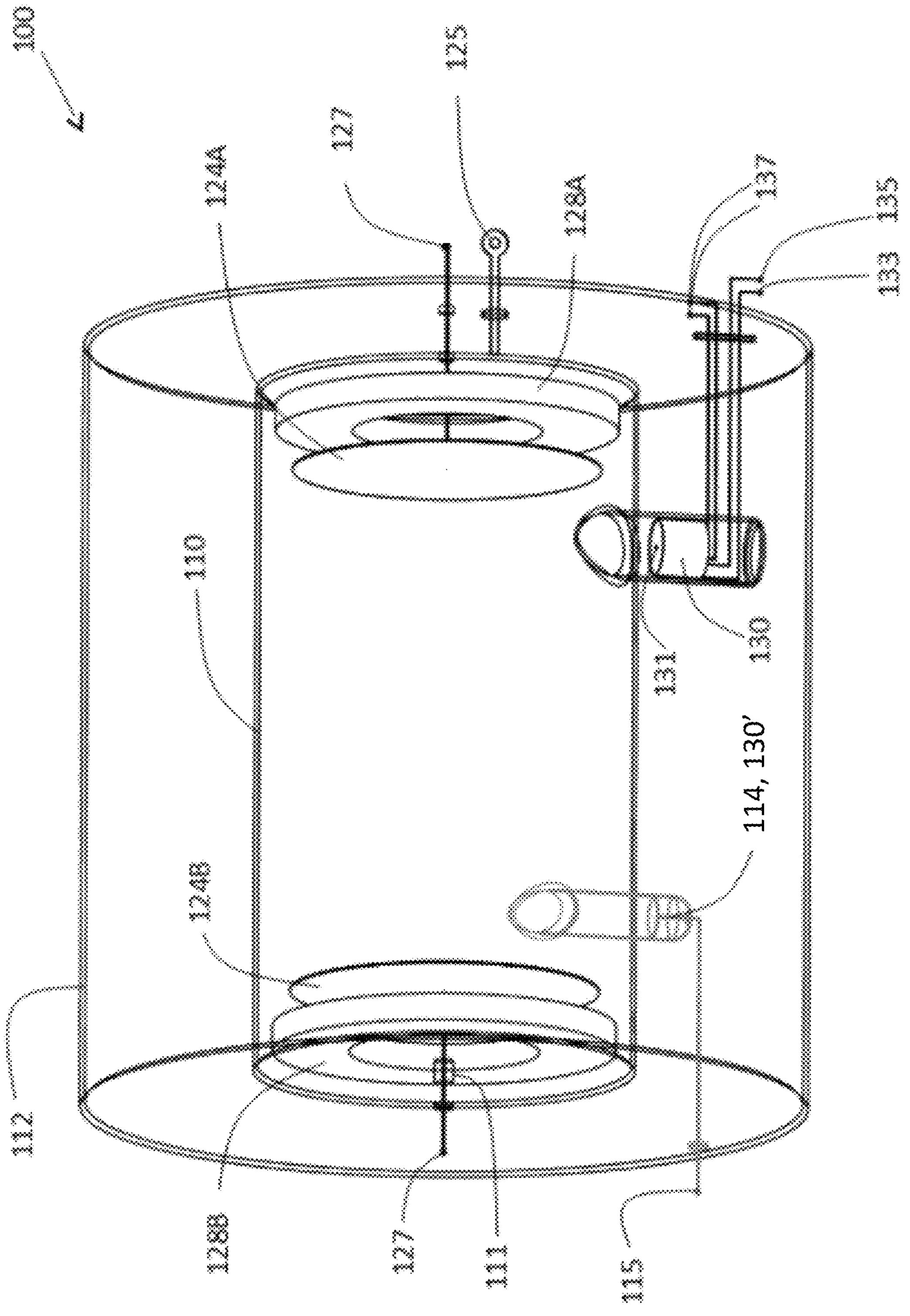
FIG. 1E is an illustrative drawing of the mechanical structure and electrical connections of embodiments of an electron coil magnet system according to some embodiments.
Figure 1F:
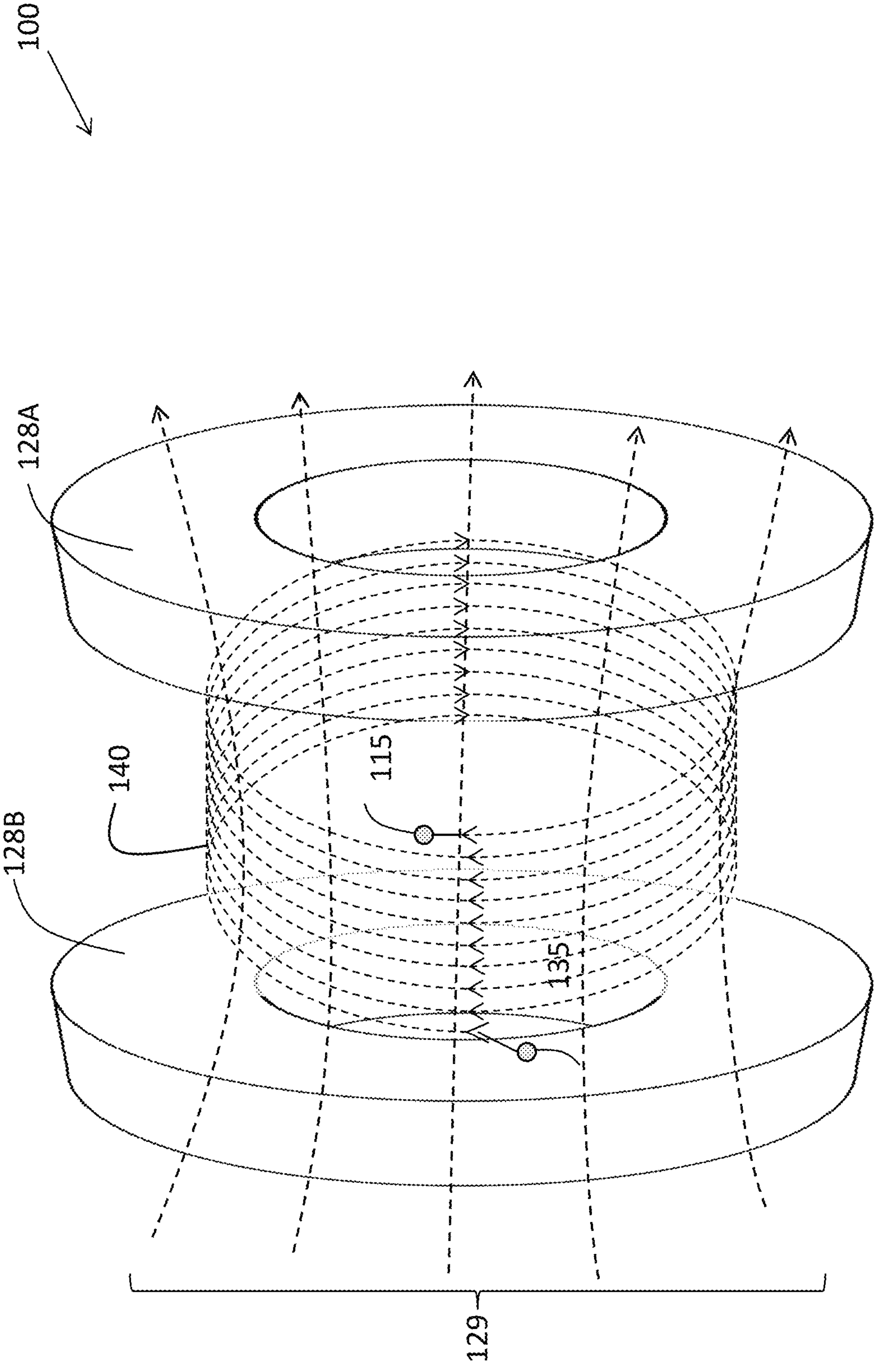
FIGS. 1F-1G show the helical electron coil path and magnetic fields associated with an electron coil magnet system according to some embodiments.
Figure 1G:
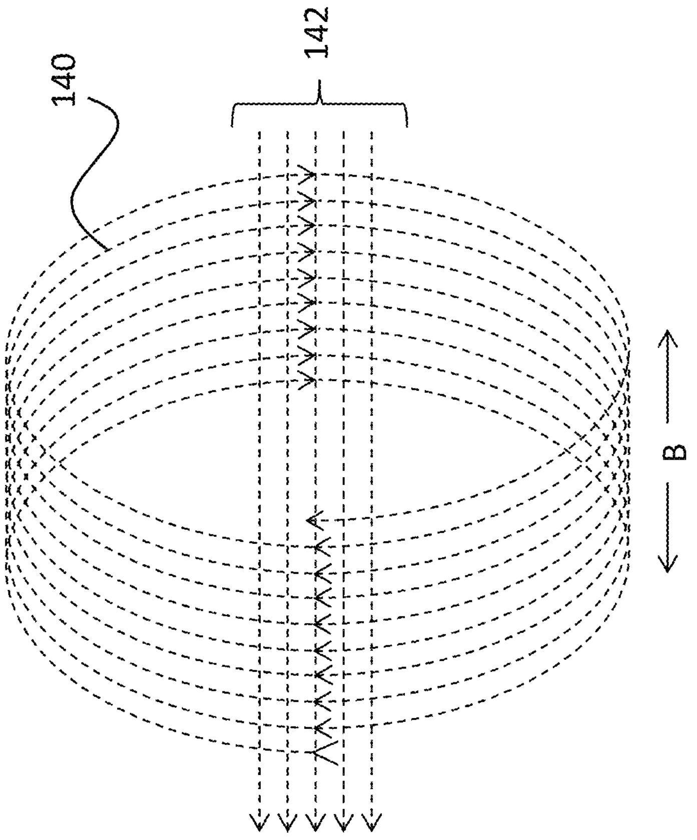

Reference is made to FIGS. 1A-1D that are schematic block diagrams showing the primary components of an electron coil magnet system according to some embodiments, FIG. 1D that is an illustrative drawing of the mechanical structure and electrical connections of embodiments of an electron coil magnet system according to some embodiments, and FIGS. 1F-1G that show the helical electron coil path and magnetic fields associated with an electron coil magnet system according to some embodiments.

As shown in FIG. 1A, an electron coil magnet system 100 for generating an electron coil 140 (FIG. 1G) includes a vacuum container 110, a supplied magnetic field (SMF) producer 120, and an electron gun 130. In some embodiments, ECMS 100 may include a second electron gun 130'. In some embodiments, ECMS 100 further includes a collector electrode 114. In some embodiments, ECMS may further include repelling plates 124. In some embodiments, ECMS 100 may be contained and enclosed in a shielding container 112 for providing magnetic shielding and for enclosing the ECMS 100.

Non-limiting examples of materials used to form vacuum container 110 may include glass, ceramic, plastic, metal such as aluminum or steel and so forth. In some embodiments, the vacuum in vacuum container 110 may be better than $5\times10^{-1}$ Torr. In some embodiments, where vacuum container 110 is formed of a metal, vacuum container 110 may be electrically connected to a power supply or negative charge supply such as but not limited to a Van de Graaff generator.

In some embodiments, electron gun 130' is the same as electron gun 130 as described herein. Non-limiting examples of electron gun 130 emission mechanisms suitable for use in ECMS 100 include but are not limited to thermionic (hot cathode), photocathode, field emission (cold cathode), or plasma source. Electrons exit electron gun 130 via electron gun output 131. In some embodiments, electron gun 130 may be positioned such that output 131 is positioned within SMF 129. In some embodiments, electron gun 130 may be positioned such that output 131 is positioned outside of SMF 129 (such as shown in FIG. 1E).

In some embodiments, the potential of collector electrode 114 can be varied from negative to positive values.

In some embodiments, SMF producer 120 may be positioned outside of vacuum container 110. In some embodiments, SMF producer 120 may be positioned inside of vacuum container 110 (such as shown in FIG. 1E). Varying embodiments of ECMS 100 are proposed as shown in FIGS. 1B-1D:

As shown in FIG. 1B, in some embodiments, SMF producer 120 includes fixed magnets 128 that provide SMF 129. In the illustrative embodiment of FIG. 1B, two fixed magnets 128A and 128B are shown but this number should not be considered limiting. In practice the number, positioning, and strength of fixed magnets 128 used for implementing SMF producer 120 will depend on the SMF 129 required. An embodiment of the SMF producer 120 of FIG. 1B is shown in FIG. 1E;

As shown in FIG. 1C, in some embodiments, electron gun 130 includes one or more of:

- an electron velocity control 132 to control the exit velocity of electrons from electron gun output 131 either at an accelerating or non-accelerating velocity;
- an angle control 134 for adjusting the exit angle of the electrons from electron gun output 131. Non-limiting examples of angle control mechanisms include mechanical and electrostatic deflection;
- a focus control 136 to control the spot size of electrons fired per unit of time from electron gun 130. In some non-limiting embodiments, focus control 136 may be a focus anode;

As shown in FIG. 1D, in some embodiments, ECMS 100 includes a controller 138 for operating and monitoring ECMS 100. Controller 138 is a computer as defined herein. In some embodiments, controller 138 enables altering of the MFD of ECMS 100 by manipulating one or more of: velocity control 132, angle control 134, focus control 136, and/or the distance "L" between coils 122A and 122B and current therein. In some embodiments, controller 138 is in data communication with one or more of the components of an ECMS 100 for controlling the ECMS 100.

With reference to FIG. 1E, electron gun 130 and collector electrode 114 or parts of electron gun 130 and collector electrode 114 are inserted into vacuum container 110. Electron gun 130 includes a cathode (not shown) electrically connected to cathode terminal 133 for connection thereof to a power source (not shown). Electron gun 130 includes an electron gun anode (not shown) electrically connected to an electron gun anode terminal 135 for connection thereof to a power source (not shown). In some embodiments, electron gun 130 includes a filament (not shown) electrically connected to filament terminals 137 for connection of a power source (not shown) thereto.

Vacuum sealing ports 111 provide passage for conductors passing into vacuum container 110 such that these will not affect the integrity of the vacuum in vacuum container 110. The conductors connecting electron gun 130 to terminals 133, 135, and 137 each pass into vacuum container 110 via one of vacuum sealing ports 111.

Collector electrode 114 is electrically connected to collector electrode terminal 115 for connection thereof to external devices (not shown). The conductors connecting collector electrode 114 to terminal 115 pass into vacuum container 110 via one of vacuum sealing ports 111.

An exemplary non-limiting implementation of repelling plate 124 is shown in FIG. 1E. The shape and dimensions of plate 124 as shown should not be considered limiting. Repelling plate 124 is provided for electrostatic repulsion of electrons towards the center of SMF 129. In some embodiments, two or more repelling plates 124 are provided. As shown in FIG. 1E, two repelling plates 124A and 124B are provided. In some embodiments, repelling plate 124 is positioned inside vacuum container 110 and is connected to repel plate terminal 127 through one of vacuum sealing ports 111.

As above, in some embodiments, where vacuum container 110 is formed of a metal, vacuum container 110 may be electrically connected to a power supply or negative charge supply such as but not limited to a Van de Graaff Generator via vacuum container terminal 125 such that vacuum container 110 has a negative potential. In some embodiments, (such as shown in FIG. 1E) both of repelling plates 124 and charged vacuum container 110 are provided.

With reference to FIGS. 1F and 1G, in use, electron gun 130 fires electrons at a SMF 129 within vacuum container 110. In some embodiments, fired electrons are collected by collector electrode 114.

The coil radius, and coil density of electron coil 140 in vacuum container 110 are determined by variation of one or more of the following interrelated parameters:

- the strength of the SMF 129 will affect the coil radius;
- the insertion velocity of the electrons from electron gun 130 into SMF 129 will affect the coil radius where the insertion velocity is affected by the potential of the acceleration anode in electron gun 130;
- the angle of insertion as well as the SMF 129 will affect the electron coil 140 windings density.

As a result of the movement of the charged particles in a helical trajectory of electron coil 140 (FIGS. 1F and 1G), a magnetic field is created, (that may be referred to as a self-field) herein referred to as a self-generated magnetic field (SGMF) 142 (FIG. 1J). In some embodiments, electron coil 140 may be made to occupy a distinct region inside a controlled width beam of 0.1 to 2 cm—designated as distance "B" (FIG. 1G). In some embodiments, such as described above with reference to FIG. 1D, electron coil 140 may be adjustable to thereby adjust the MFD generated by ECMS 100. In some embodiments, ECMS 100 may include a second electron gun 130' positioned, for example, in place of collector electrode 114, and controller 138 enables switching of the magnetic polarity of the SGMF 142 by switching the output of electrons from one electron gun to the other.

In some embodiments, terminals 115 and 133 provide external electrical connections to electron coil 140. In some embodiments, terminals 115 and 135 provide external electrical connections to electron coil 140.

In a non-limiting example, the voltage applied to terminal 135 may be between 100V to 5000V.

Figure 2A:
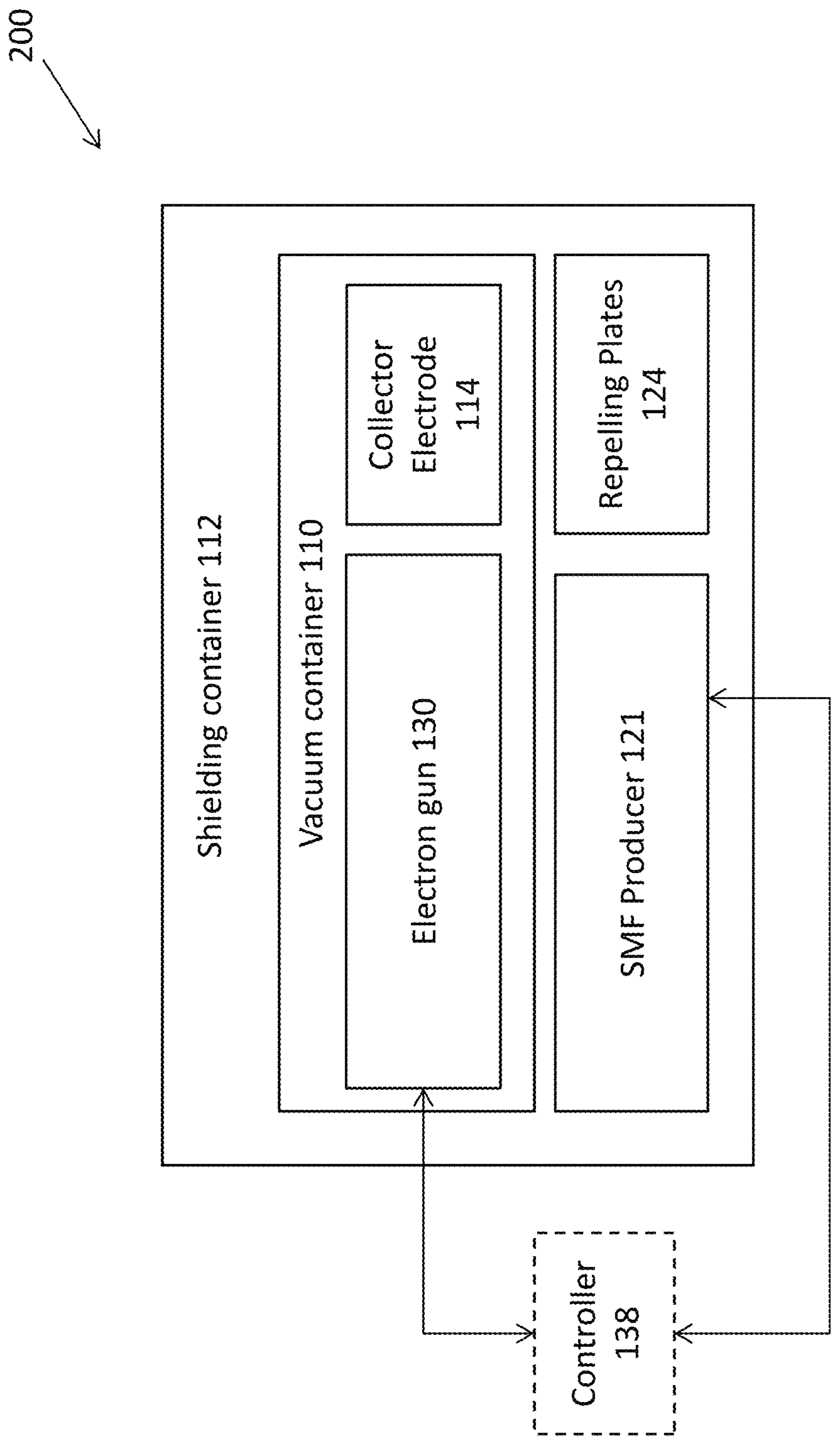
FIGS. 2A-2B are schematic block diagrams showing the primary components of an electron coil magnet system according to some embodiments.
Figure 2B:
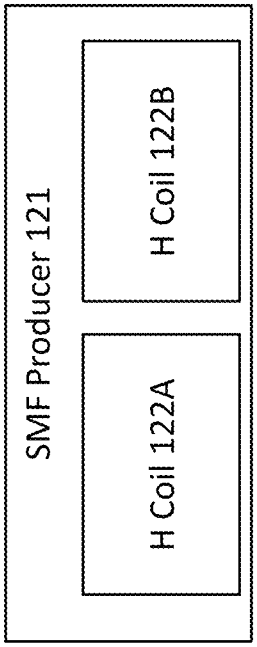
Figure 2C:
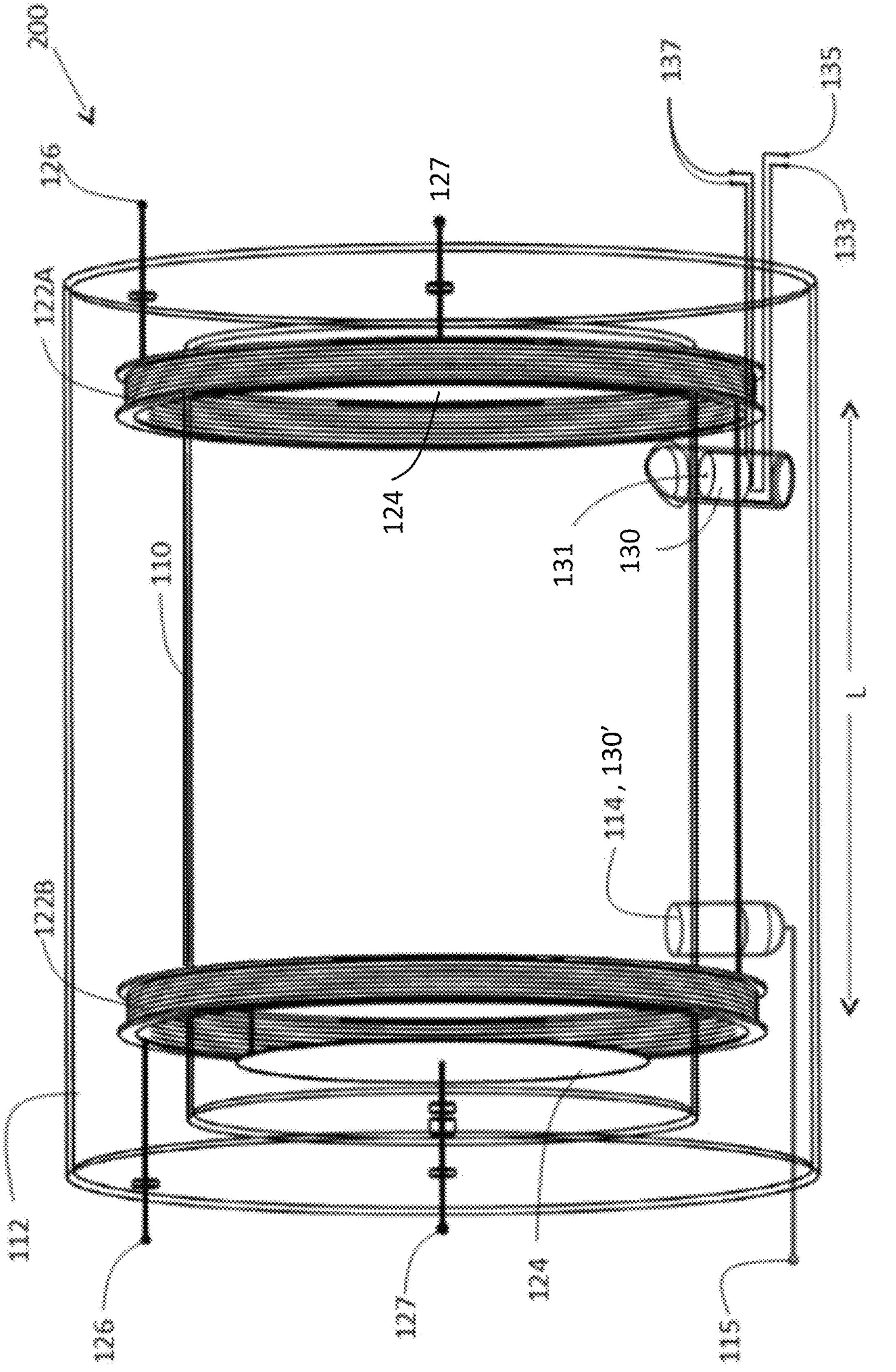
FIG. 2C is an illustrative drawing of the mechanical structure and electrical connections of embodiments of an electron coil magnet system according to some embodiments.
Figure 2D:
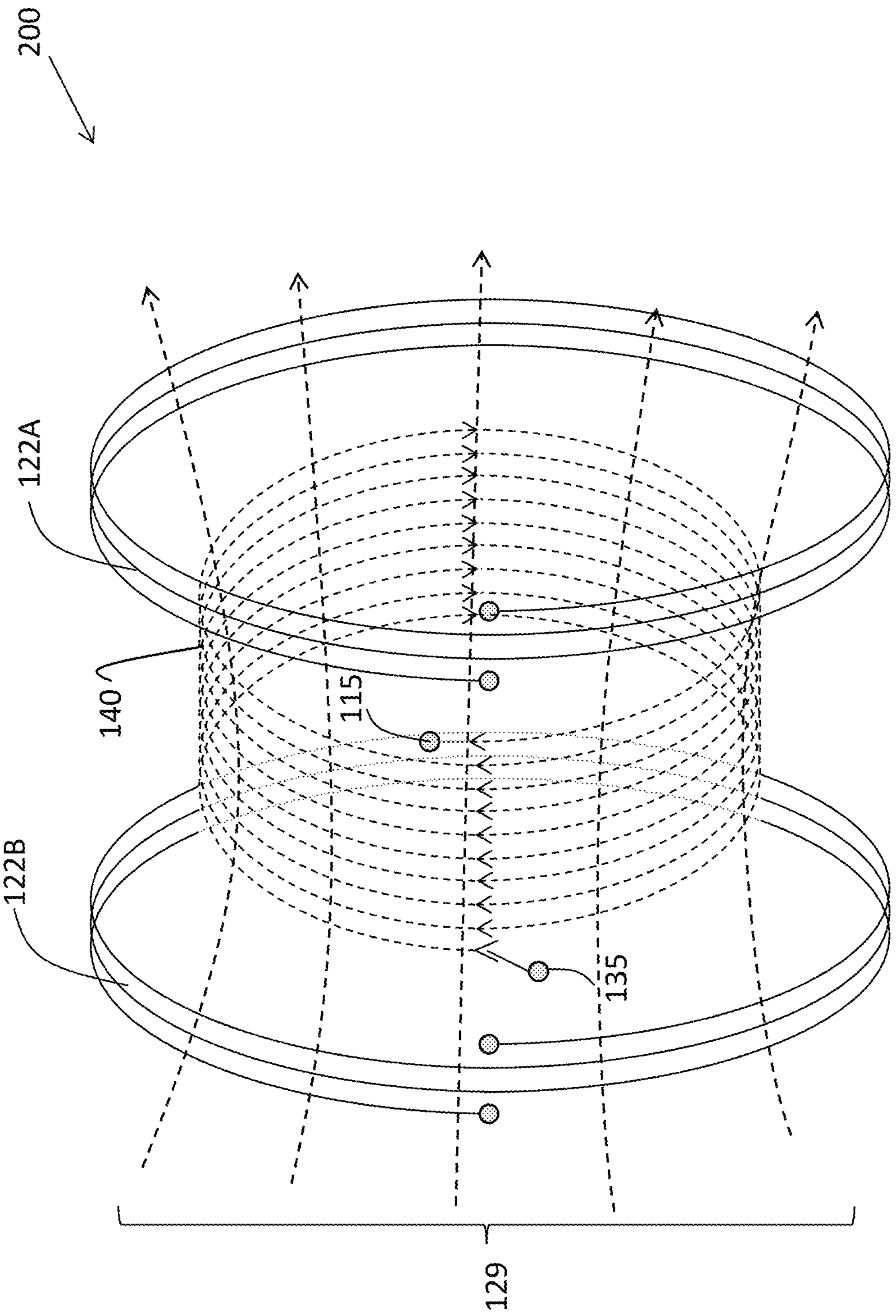
FIGS. 2D-2E show the helical electron coil path and magnetic fields associated with an electron coil in vacuum system according to some embodiments.
Figure 2E:
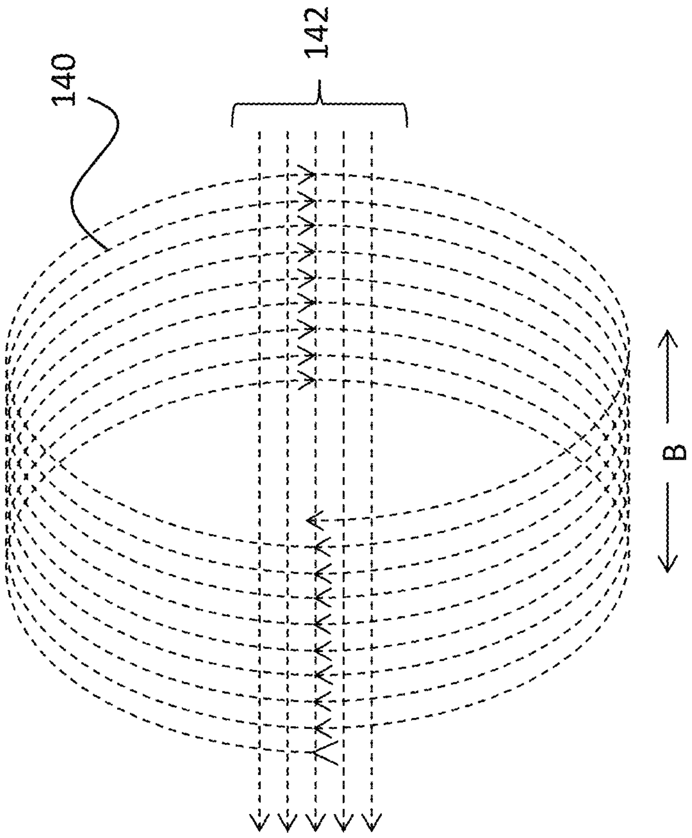

Reference is made to FIGS. 2A-2B that are schematic block diagrams showing the primary components of an electron coil magnet system according to some embodiments, FIG. 2C that is an illustrative drawing of the mechanical structure and electrical connections of embodiments of an electron coil magnet system according to some embodiments, and FIGS. 2D-2E that show the helical electron coil path and magnetic fields associated with an electron coil magnet system according to some embodiments.

ECMS 200 is essentially the same as ECMS 100 and parts with the same numbers have the same functions as described above with reference to FIGS. 1A-1G. In ECMS 200, SMF producer 121 is structured differently as compared to SMF producer 120. FIG. 2B, shows an embodiment of SMF producer 121 that includes two coils 122A and 122B for production of SMF 129 (FIG. 2D). In some embodiments, coils 122A and 122B are Helmholtz coils. Exemplary non-limiting implementations of coils 122 are shown in FIG. 2C where coils 122 are illustratively positioned outside and around vacuum container 110. The number of turns shown in coils 122 and the distance "L" between coils 122 as shown in FIG. 2C should not be considered limiting. In a non-limiting example, each of coils 122 includes 150 turns carrying a current of 1A, or 150 Ampere turns.

As shown in FIG. 2C, coils 122A and 122B are connected to a power source (not shown) via coil terminals 126. The conductors connecting to coil terminals 126 each pass into vacuum container 110 via one of vacuum sealing ports 111. As shown in FIG. 2C, electron gun 130 is positioned such that output 131 is positioned within SMF 129. In some embodiments, SMF producer 120 may be positioned outside of vacuum container 110 (such as shown in FIG. 2C). In some embodiments, controller 138 is in data communication with one or more of the components of an ECMS 200 for controlling the ECMS 200.

In some embodiments, ECMS 200 may include a second electron gun 130' positioned, for example, in place of collector electrode 114, and controller 138 enables switching of the magnetic polarity of the SGMF 142 by switching the output of electrons from one electron gun to the other.

With reference to FIGS. 2D and 2E, in use, electron gun 130 fires electrons at an SMF 129 within vacuum container 110. In some embodiments, fired electrons are collected by collector electrode 114. As a result of the movement of the charged particles in a helical trajectory of electron coil 140 (FIGS. 2D and 2E), a self-generated magnetic field (SGMF) 142 (FIG. 2E) is created.

Figure 3A:
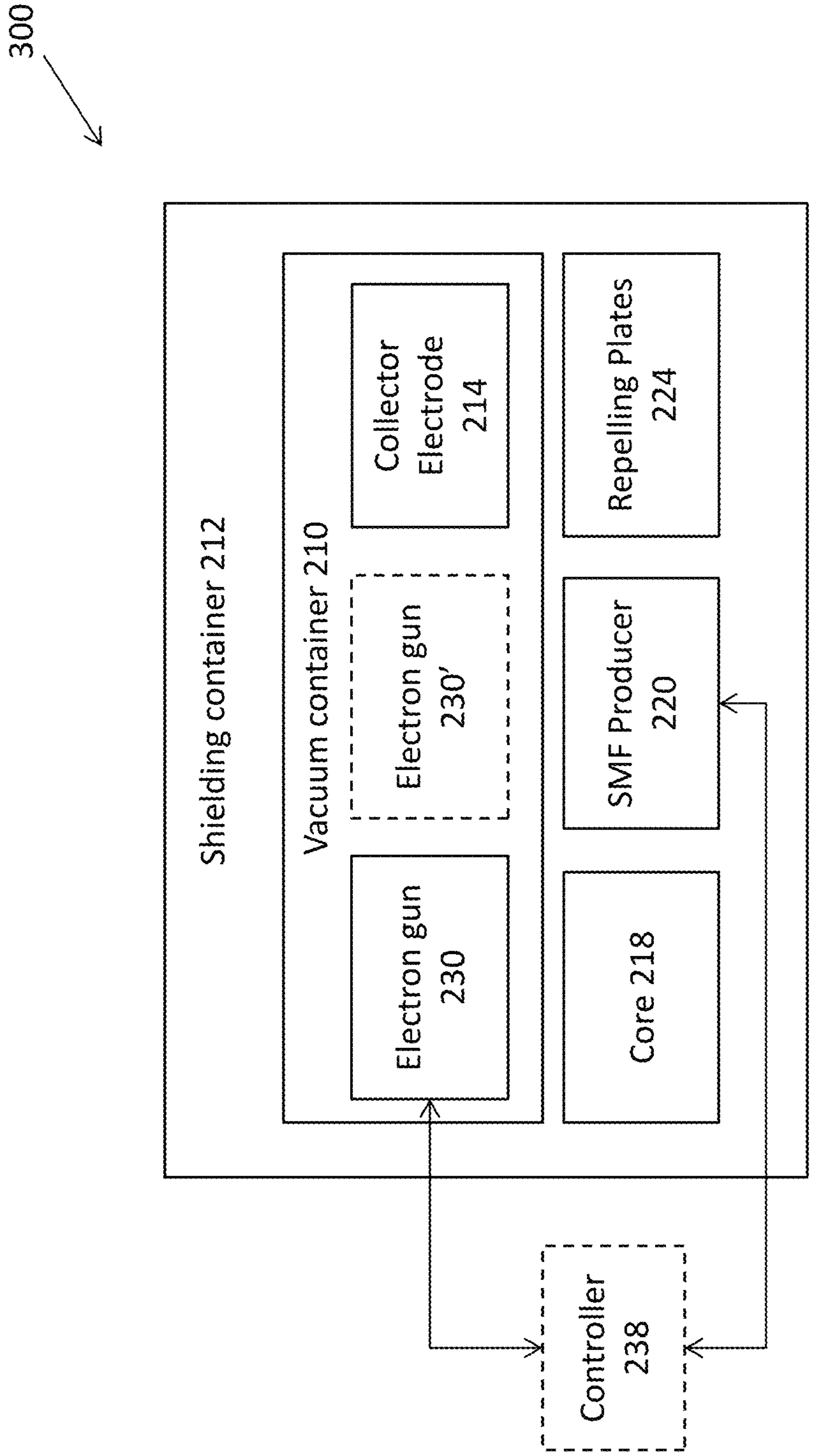
FIG. 3A is a schematic block diagram showing the primary components of an electron coil magnet with a metallic core according to some embodiments.
Figure 3B:
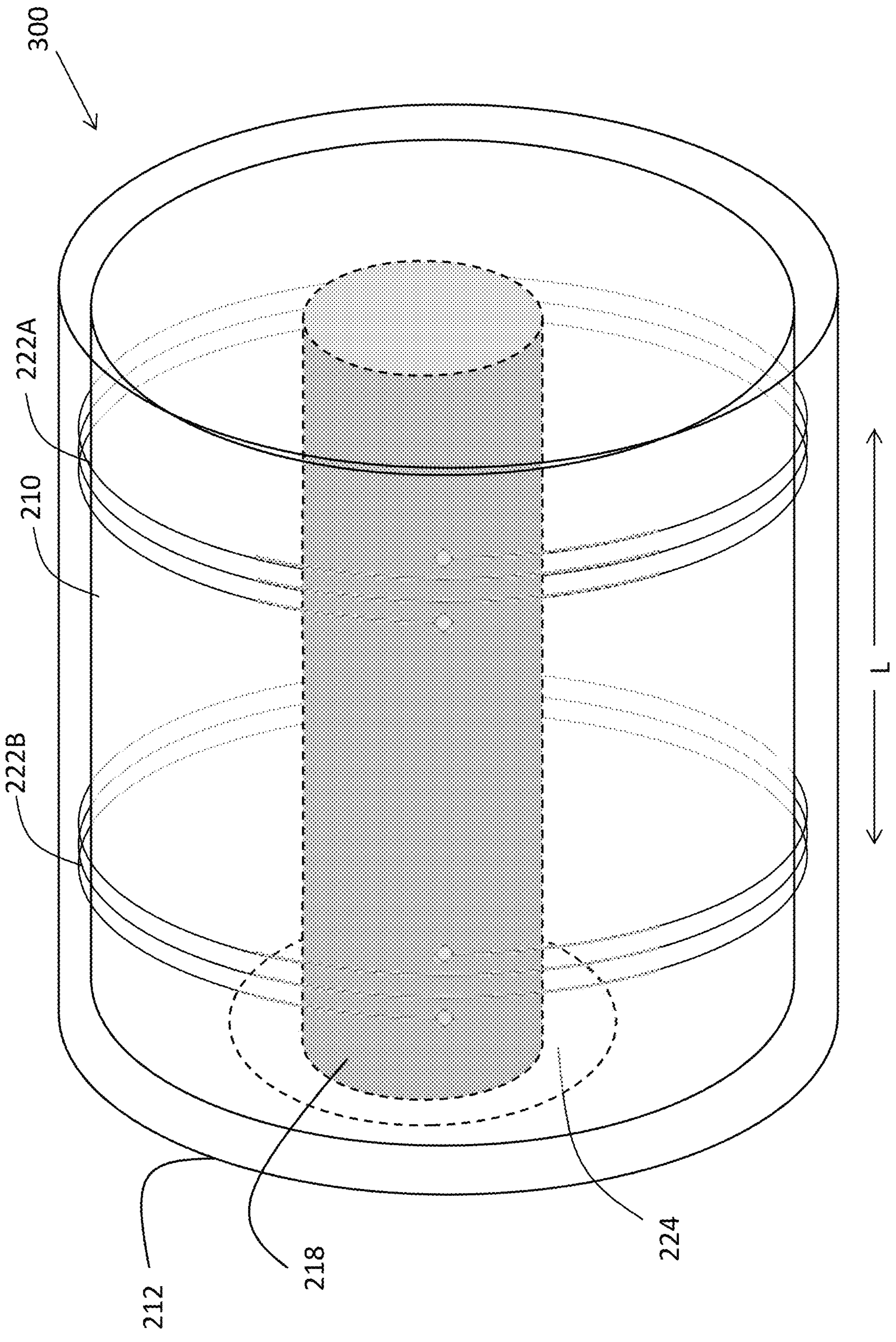
FIG. 3B is an illustrative drawing of the mechanical structure and electrical connections of an electron coil magnet with a metallic core according to some embodiments.
Figure 3C:
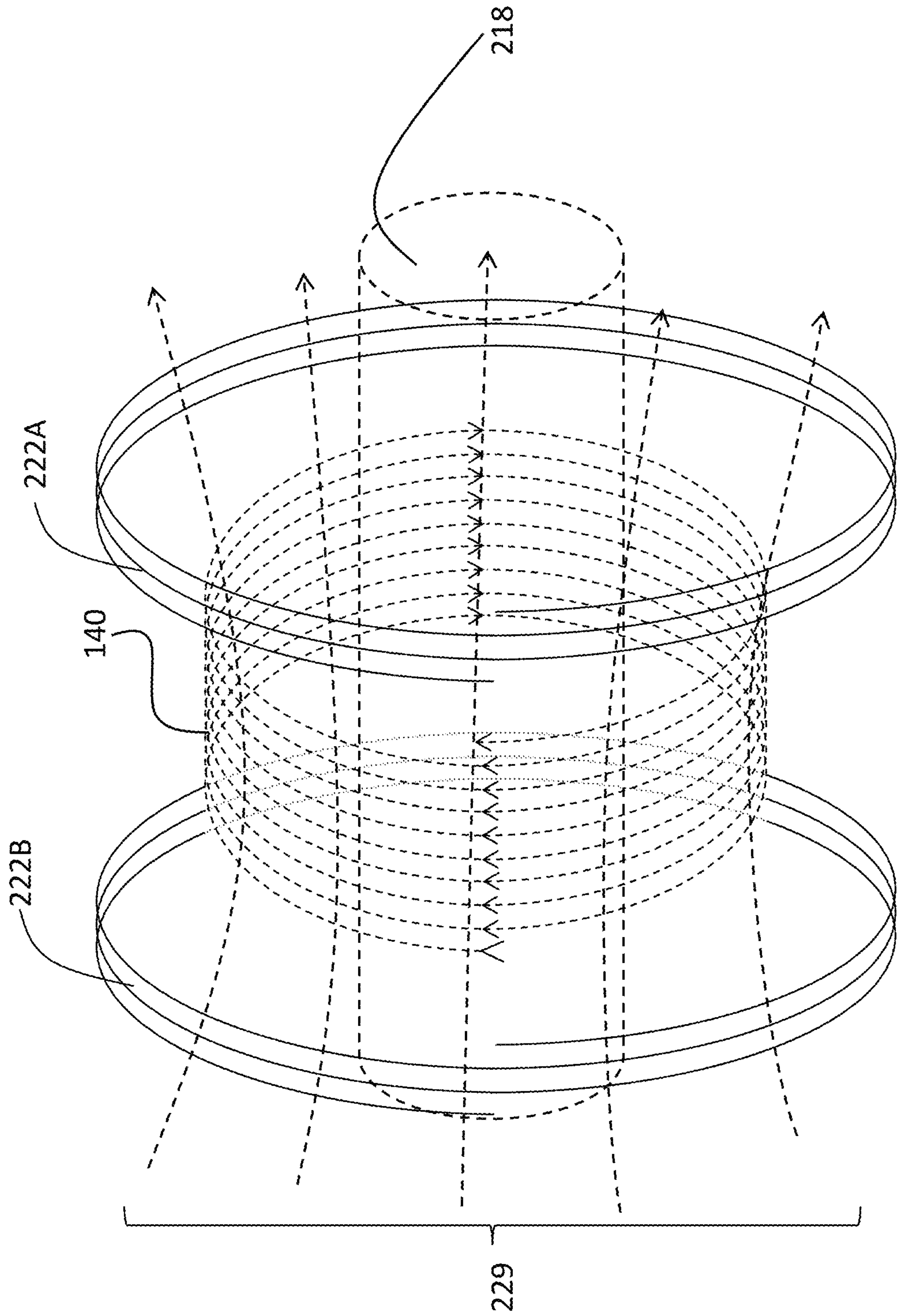
FIGS. 3C-3D show helical electron coil paths and magnetic fields associated with an electron coil magnet with a metallic core according to some embodiments.
Figure 3D:
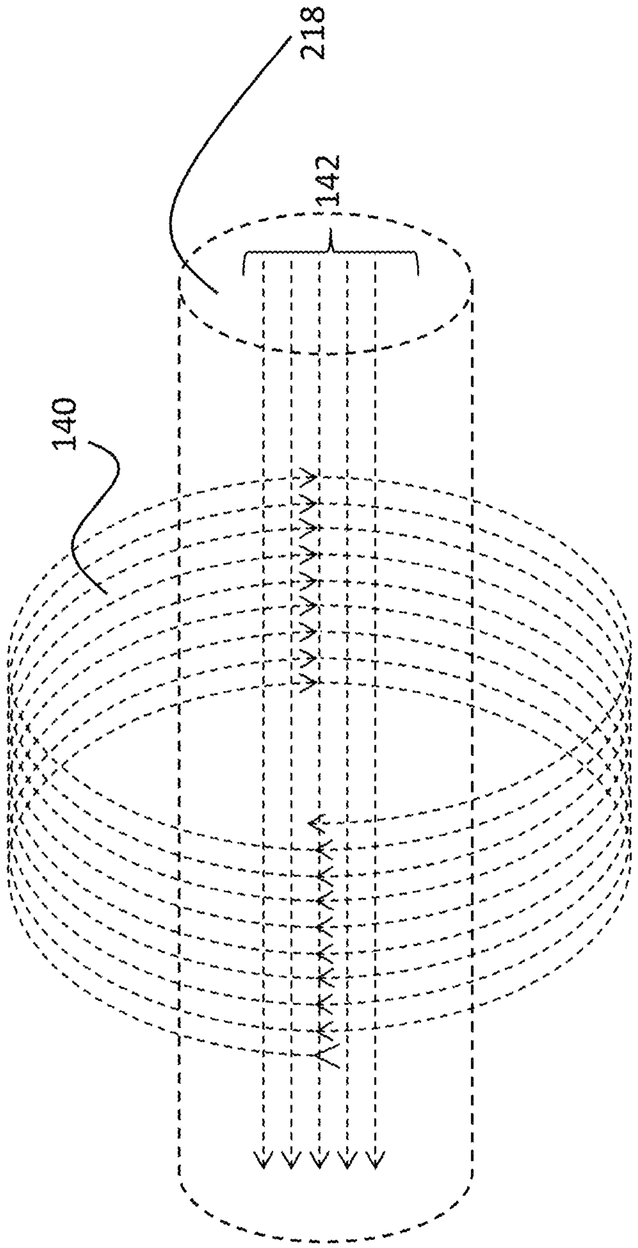

Reference is made to FIG. 3A which is a schematic block diagram showing the primary components of an electron coil magnet with a metallic core according to some embodiments, FIG. 3B which is an illustrative drawing of the mechanical structure and electrical connections of an electron coil magnet with a metallic core according to some embodiments, and FIGS. 3C-3D that show helical electron coil paths and magnetic fields associated with an electron coil magnet with a metallic core according to some embodiments.

As shown in FIG. 3A, ECMS 300 for generating an electron coil 140 (FIGS. 3C-3D) includes a vacuum container 210, a supplied magnetic field (SMF) producer 220, and an electron gun 230. In some embodiments, ECMS 300 may include a second electron gun 230'. In some embodiments, ECMS 300 further includes a collector electrode 214. In some embodiments, ECMS 300 may be contained in a shielding container 212 for providing magnetic shielding and for enclosing ECMS 300. Electron gun 230 fires electrons at SMF 229 (FIG. 3C) within vacuum container 210. In some embodiments, fired electrons are collected by collector electrode 214.

As shown in FIGS. 3A-3B, ECMS 300 includes an ECMS core 218. ECMS core 218 includes a magnetically permeable material such as but not limited to a metal or an alloy, and/or a material having a high magnetic flux saturation level. ECMS core 218 serves to concentrate the self-generated MF (SGMF) 142 (FIG. 3D), so as to strengthen its flux density. In some embodiments, core 218 is formed from more than one section to prevent formation of eddy currents. In some embodiments, core 218 is formed from mu-metal. Vacuum container 210 includes glass, ceramic, plastic and so forth and is adapted for insertion and holding of ECMS core 218.

Electron guns 230 and 230' are the same as electron gun 130 described hereinabove. Collector electrode 214 is the same as collector electrode 114 described hereinabove. SMF producer 220 is the same as SMF producer 121 described hereinabove. Electron gun 230 and collector electrode 214 or parts of electron gun 230 and collector electrode 214 are inserted into vacuum container 210 via vacuum sealing ports (not shown) so as not to affect the integrity of the vacuum in vacuum container 210. In some embodiments, SMF producer 220 may be positioned outside of vacuum container 210. In some embodiments, SMF producer 220 may be positioned inside of vacuum container 210.

An exemplary non-limiting implementation of coils 222 used in SMF producer 220 is shown in FIG. 3B. The number of turns shown in coils 222 and the distance "L" between coils 222 as shown in FIG. 3B should not be considered limiting. Repelling plate 224 is the same as repelling plate 124 described hereinabove. The shape and dimensions of plate 224 as shown in FIG. 3B should not be considered limiting. In some embodiments, SMF producer 220 includes fixed magnets such as the embodiment of SMF producer 120 of FIG. 1C described hereinabove.

As shown in FIG. 3A, in some embodiments, ECMS 300 includes a controller 238 for operating and monitoring ECMS 300. Controller 238 is a computer as defined herein. In some embodiments, controller 238 is in data communication with one or more of the components of an ECMS 300 for controlling the ECMS 300. In some embodiments, controller 238 enables altering of the MFD of ECMS 300 by manipulating one or more of electron gun 230 and/or the distance "L" between coils 222A and 222B and current therein. In some embodiments, ECMS 300 may include a second electron gun 230' positioned, for example, in place of collector electrode 214, and controller 238 enables switching of the magnetic polarity of the SGMF 142 by switching the output of electrons from one electron gun to the other.

With reference to FIGS. 3C-3D, in use, the velocity, coil radius, and coil density of electron coil 140 in vacuum container 210 are determined by variation of one or more of the interrelated parameters as described hereinabove with reference to FIGS. 1A-1G. The parameters are chosen to force electrons to move in a circular path thus creating the desired electron coil 140. As a result of the movement of the charged particles of electron coil 140, SGMF 142 is generated. As above, SGMF 142 is confined and guided by ECMS core 218.

Figure 4A:
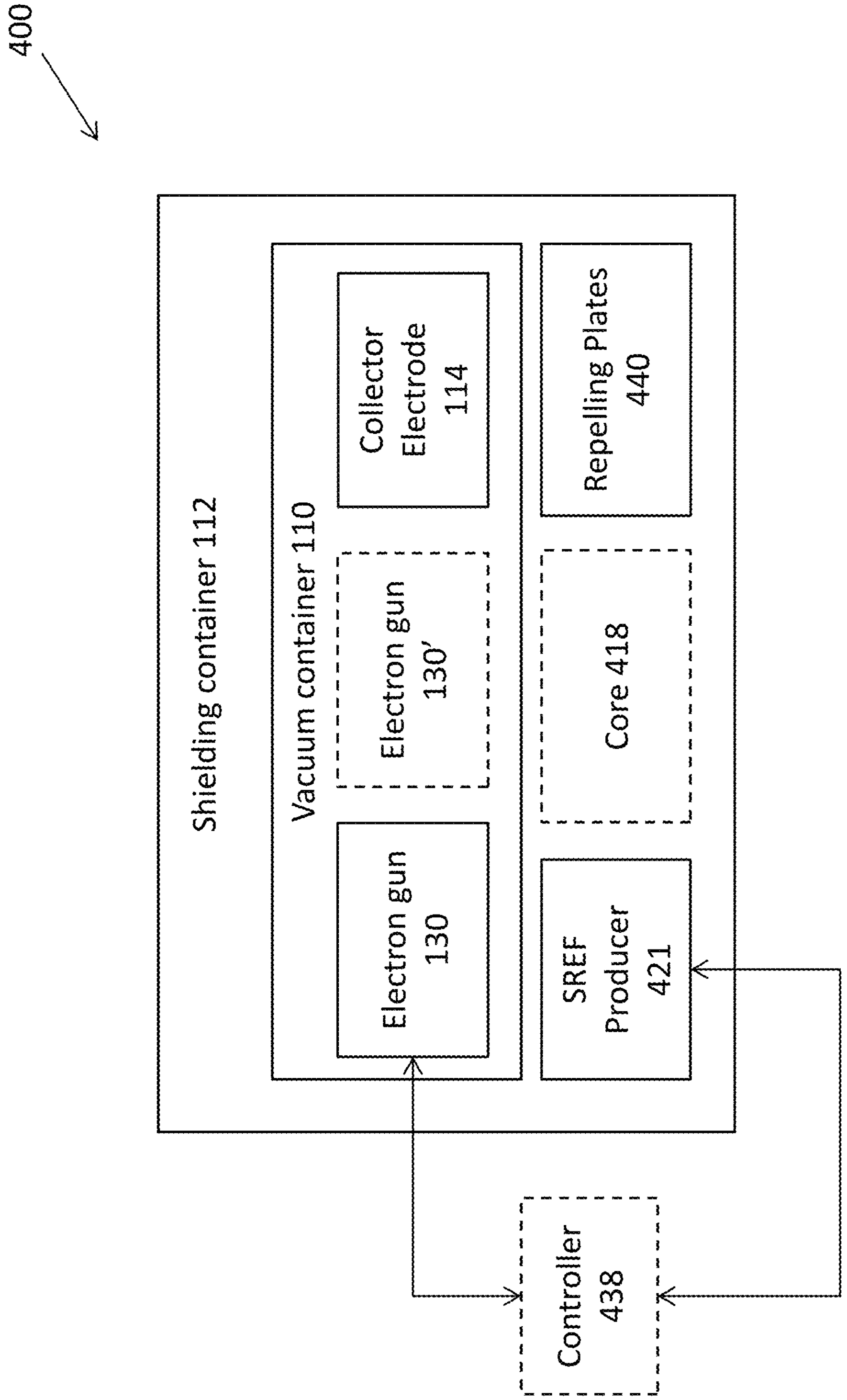
FIGS. 4A-4B are schematic block diagrams showing the primary components of an electron coil magnet system according to some embodiments.
Figure 4B:
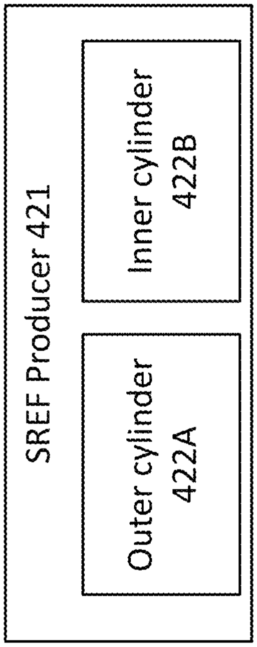
Figure 4C:
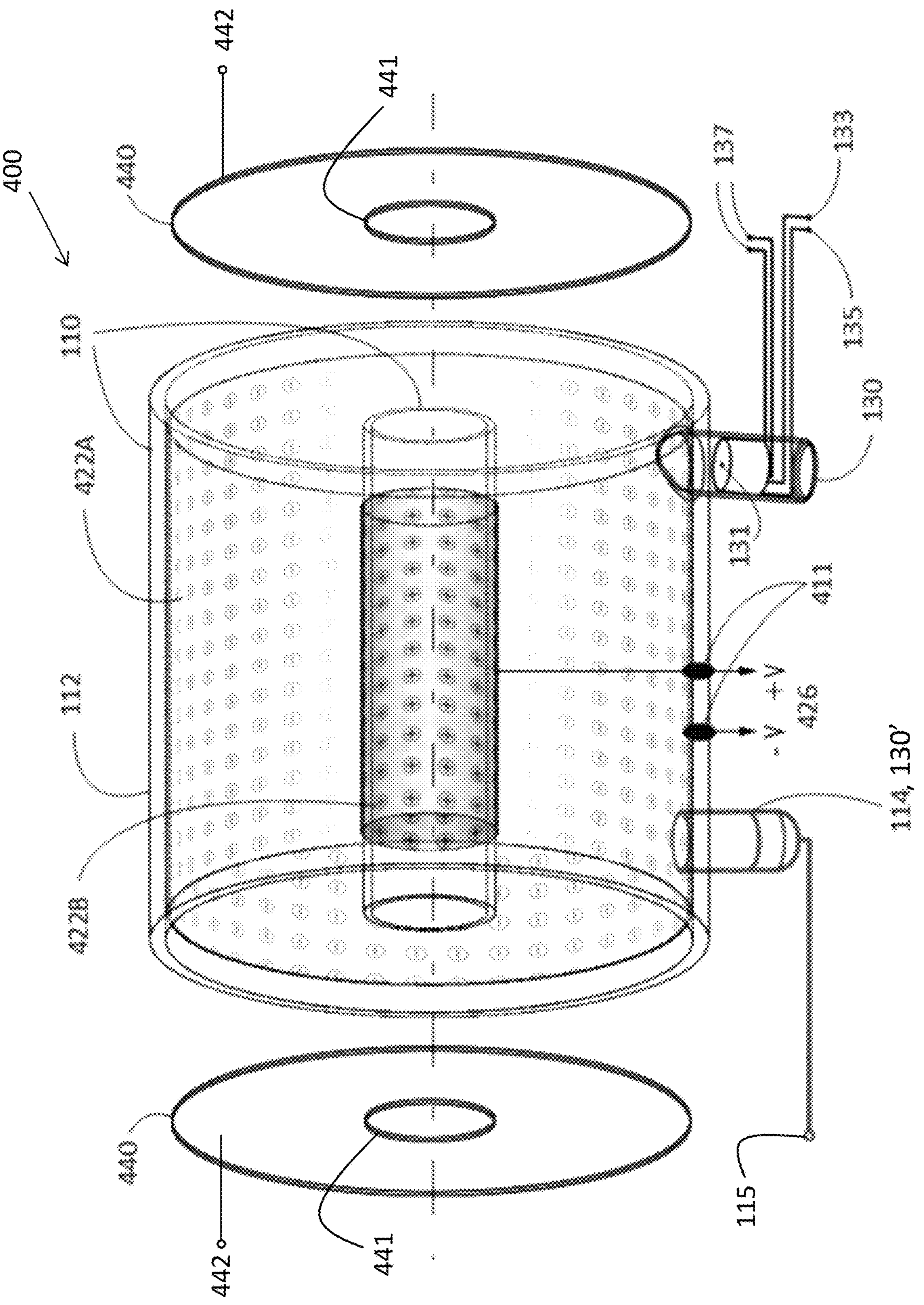
FIGS. 4C, 4G and 4H are illustrative drawings of the mechanical structure and electrical connections of embodiments of an electron coil magnet system according to some embodiments.
Figure 4D:
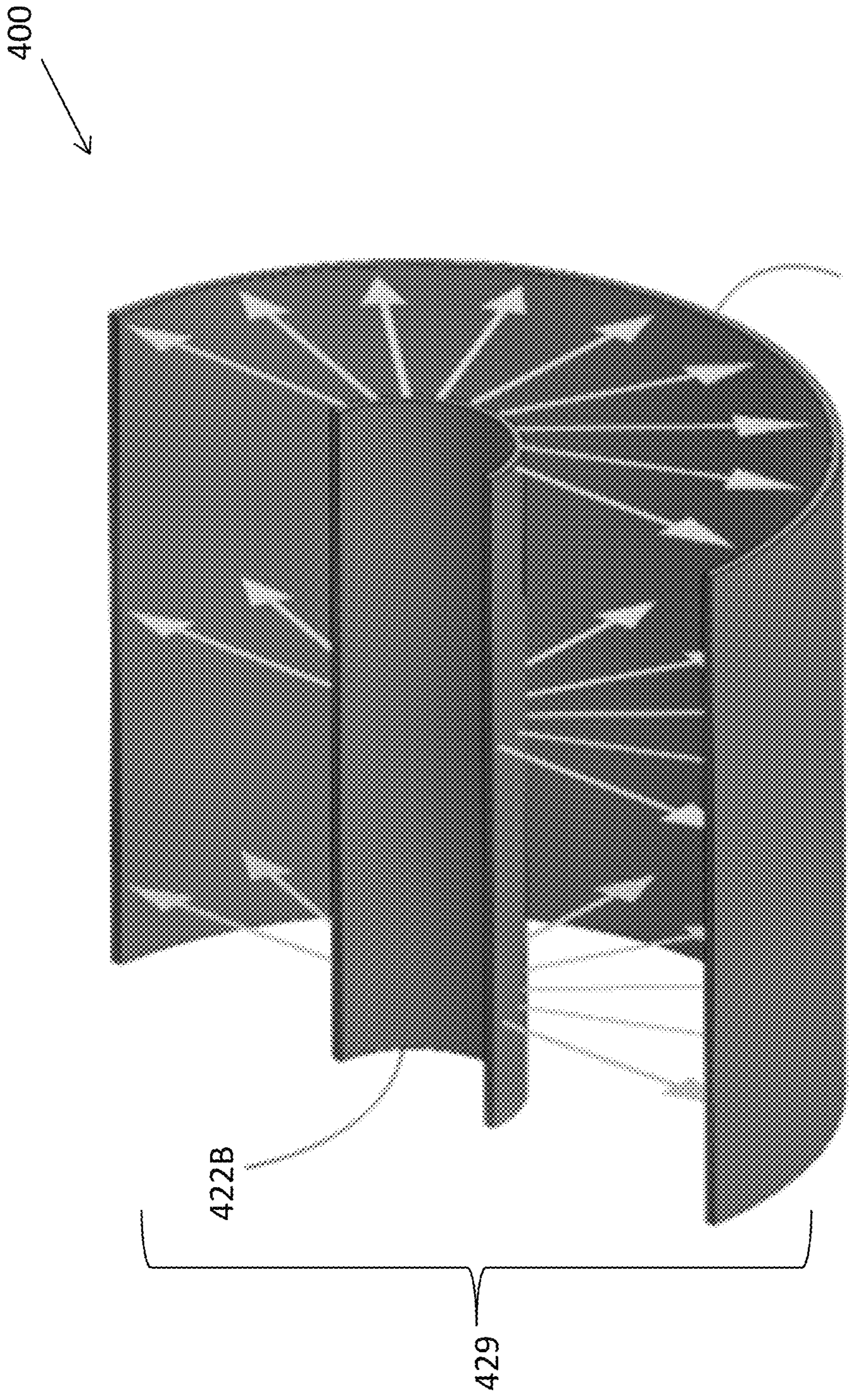
FIGS. 4D-4F show the helical electron coil path and magnetic fields associated with an electron coil magnet system according to some embodiments.
Figure 4E:
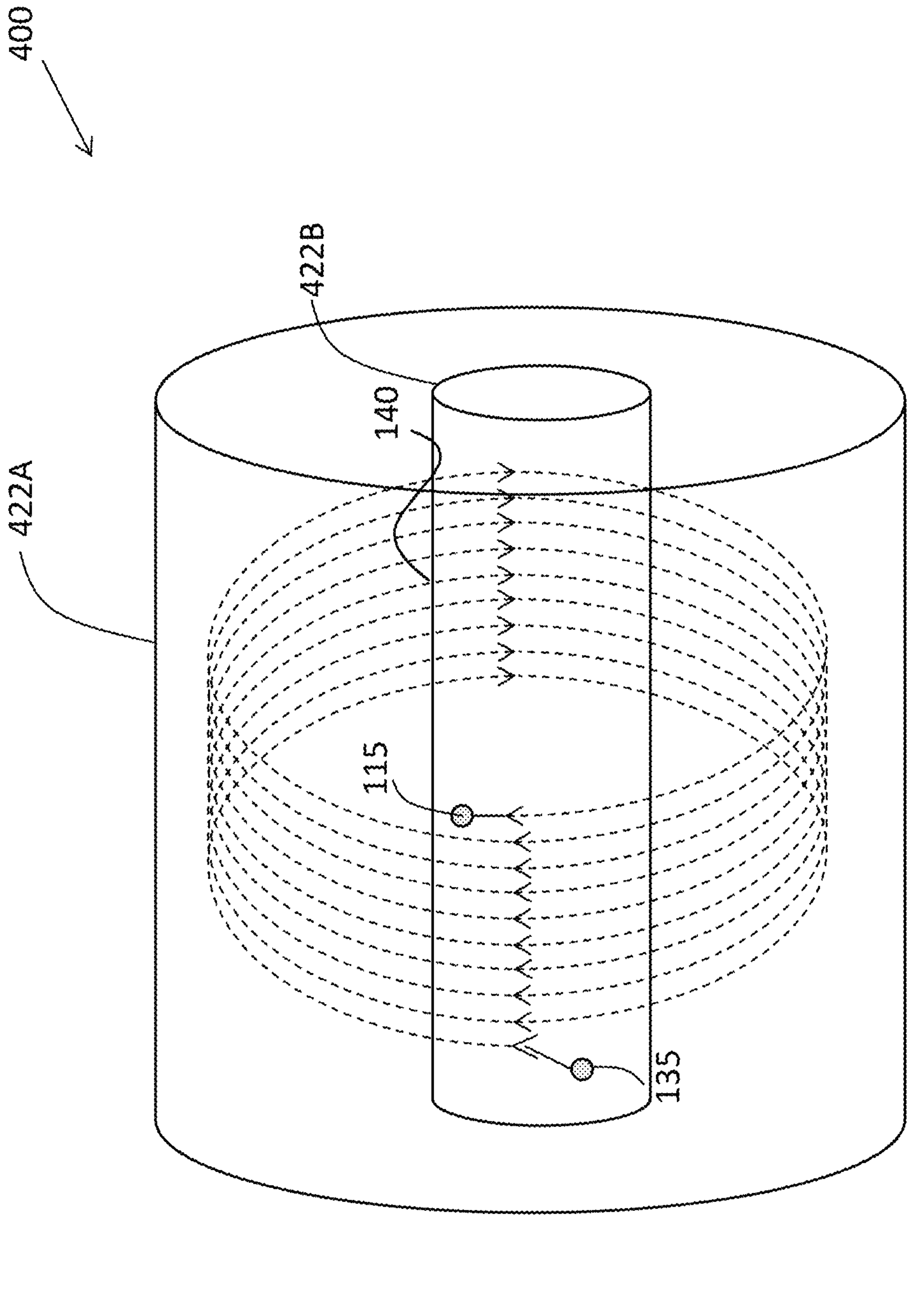
Figure 4F:
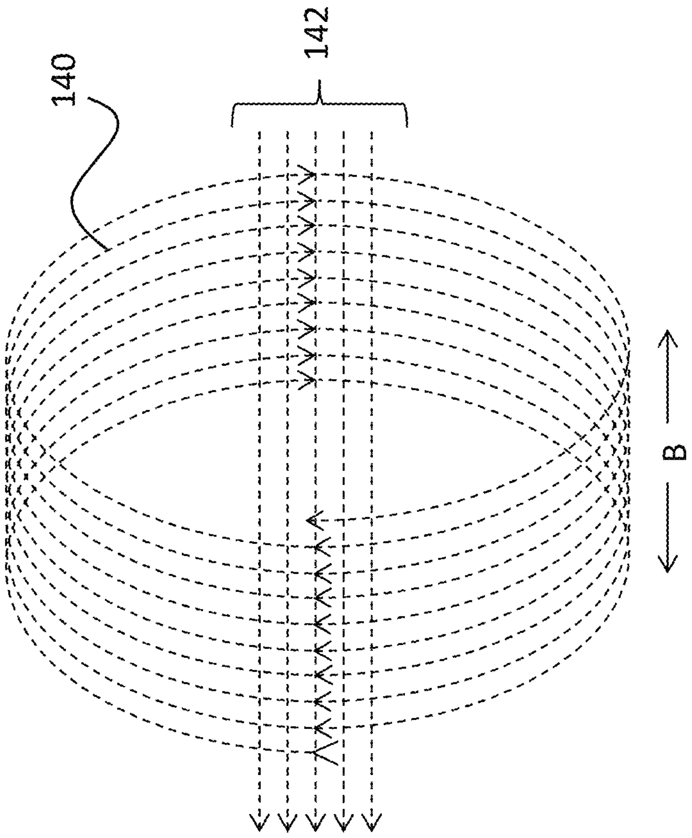
Figure 4G:
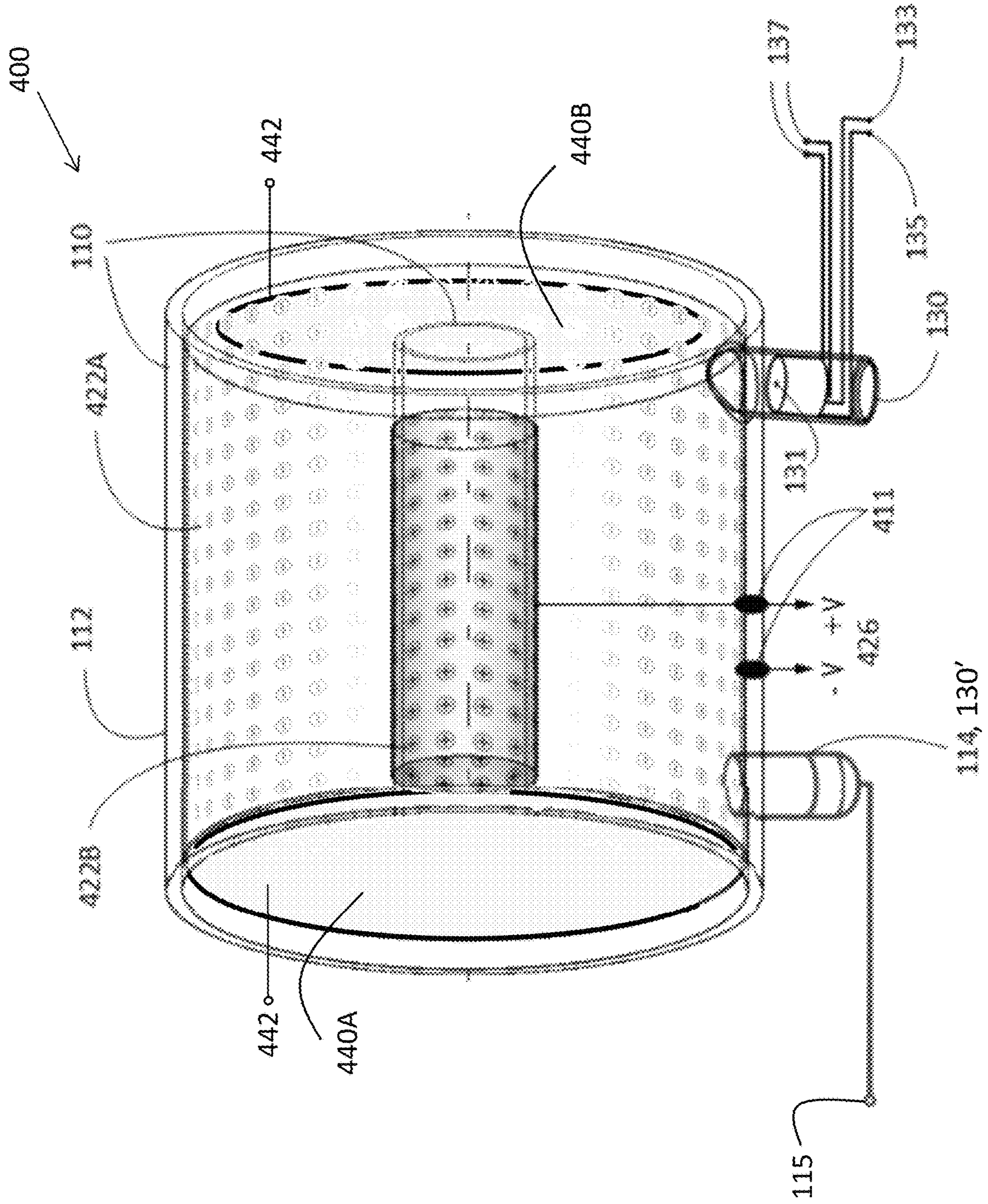
Figure 4H:
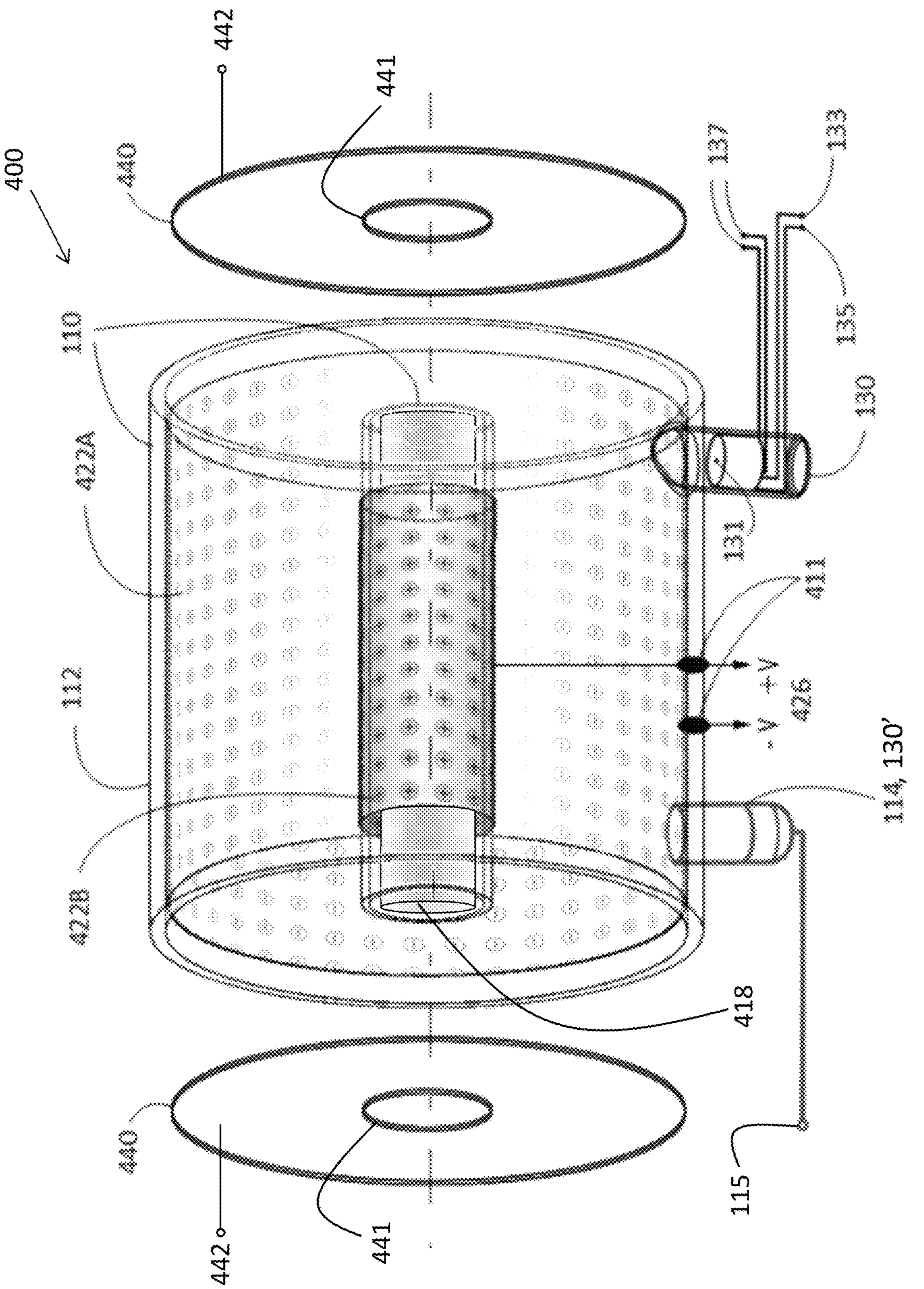

Reference is made to FIGS. 4A-4B that are schematic block diagrams showing the primary components of an electron coil magnet system according to some embodiments, FIGS. 4C, 4G, and 4H that are illustrative drawings of the mechanical structure and electrical connections of embodiments of an electron coil magnet system according to some embodiments, and FIGS. 4D-4F that show the SREF, helical electron coil path and magnetic fields associated with an electron coil magnet system according to some embodiments.

ECMS 400 is essentially the same as ECMS 100 and parts with the same numbers have the same functions as described above with reference to FIGS. 1A-1G. In ECMS 400, a supplied radial electric field (SREF) producer 421 is provided in place of an SMF producer 121. In some embodiments, ECMS 400 includes an ECMS core 418.

FIG. 4B, shows an embodiment of SREF producer 421 that includes an outer cylinder 422A and an inner cylinder 422B for production of SREF 429 (FIG. 4D). In some embodiments, outer cylinder 422A and inner cylinder 422B are both positioned inside vacuum container 110. The distance between outer cylinder 422A and an inner cylinder 422B as shown in FIG. 4C should not be considered limiting.

As shown in FIG. 4C, cylinders 422A and 422B are connected to a power source 426 via cylinder terminals. As shown in FIG. 4C, cylinder 422A is connected to a negative pole and cylinder 422B is connected to a positive pole of power source 426 but this arrangement should not be considered limiting and, in some embodiments, cylinder 422A may be connected to a positive pole and cylinder 422B may be connected to a negative pole of power source 426. The conductors connecting to power source 426 each pass into vacuum container 110 via one of vacuum sealing ports 411. Other conductors (not shown) may pass into vacuum container 110 using other vacuum sealing ports (not shown). As shown in FIG. 4C, electron gun 130 is positioned such that output 131 is positioned within SREF 429. In some embodiments, ECMS 400 includes a collector electrode 114. In some embodiments, ECMS 400 does not include a collector electrode 114.

In some embodiments, ECMS 400 includes repelling plates 440 placed on the ends of cylinders 422A and 422B. In FIG. 4C, repelling plates 440 are shown separated from vacuum container 110 for simplicity. In some embodiments, as shown in FIG. 4G repelling plates 440 may be in contact with outer cylinder 422A (such as plate 440A). In some embodiments, as shown in FIG. 4G, repelling plates 440 are not in contact with outer cylinder 422A (such as plate 440B). In some embodiments, repelling plates 440 are installed within vacuum container 110. In some embodiments, repelling plates 440 may be installed outside of vacuum container 110. Repelling plates 440 are provided for the purpose of repulsion of electrons towards the center of SREF 429. Repelling plates 440 are each connected to a power source 442. In some embodiments, repelling plates include an aperture 441 such as where an accessible hollow core is required for ECMS 400.

As shown in FIG. 4A, in some embodiments, ECMS 400 includes a controller 438 for operating and monitoring ECMS 400. Controller 438 is a computer as defined herein. In some embodiments, controller 438 is in data communication with one or more of the components of ECMS 400 for controlling ECMS 400. In some embodiments, controller 438 enables altering of the MFD of ECMS 400 by manipulating one or more of electron gun 130 and/or the voltage between cylinders 422A and 422B. or altering the magnetic polarity of the magnet. In some embodiments, ECMS 400 may include a second electron gun 130' positioned, for example, in place of collector electrode 114, and controller 138 enables switching of the magnetic polarity of the SGMF 142 by switching the output of electrons from one electron gun to the other.

As shown in FIG. 4H, in some embodiments, ECMS 400 may include an ECMS core 418. ECMS core 418 includes a magnetically permeable material such as but not limited to a metal or an alloy, and/or a material having a high magnetic flux saturation level. ECMS core 418 serves to concentrate the self-generated MF (SGMF) 142 (FIG. 4F), so as to strengthen its flux density. In some embodiments, core 418 is formed from more than one section to prevent formation of eddy currents. In some embodiments, core 418 is formed from mu-metal. In some embodiments, core 418 is not in conductive contact with inner cylinder 422B.

With reference to FIGS. 4D-4F, in use, electron gun 130 fires electrons at an SREF 429 (FIG. 4D) within vacuum container 110. In some embodiments, fired electrons are collected by collector electrode 114. As a result of the movement of the charged particles in a helical trajectory of electron coil 140 (FIGS. 4E and 4F), a self-generated magnetic field (SGMF) 142 (FIG. 4F) is created.

Figure 5A:
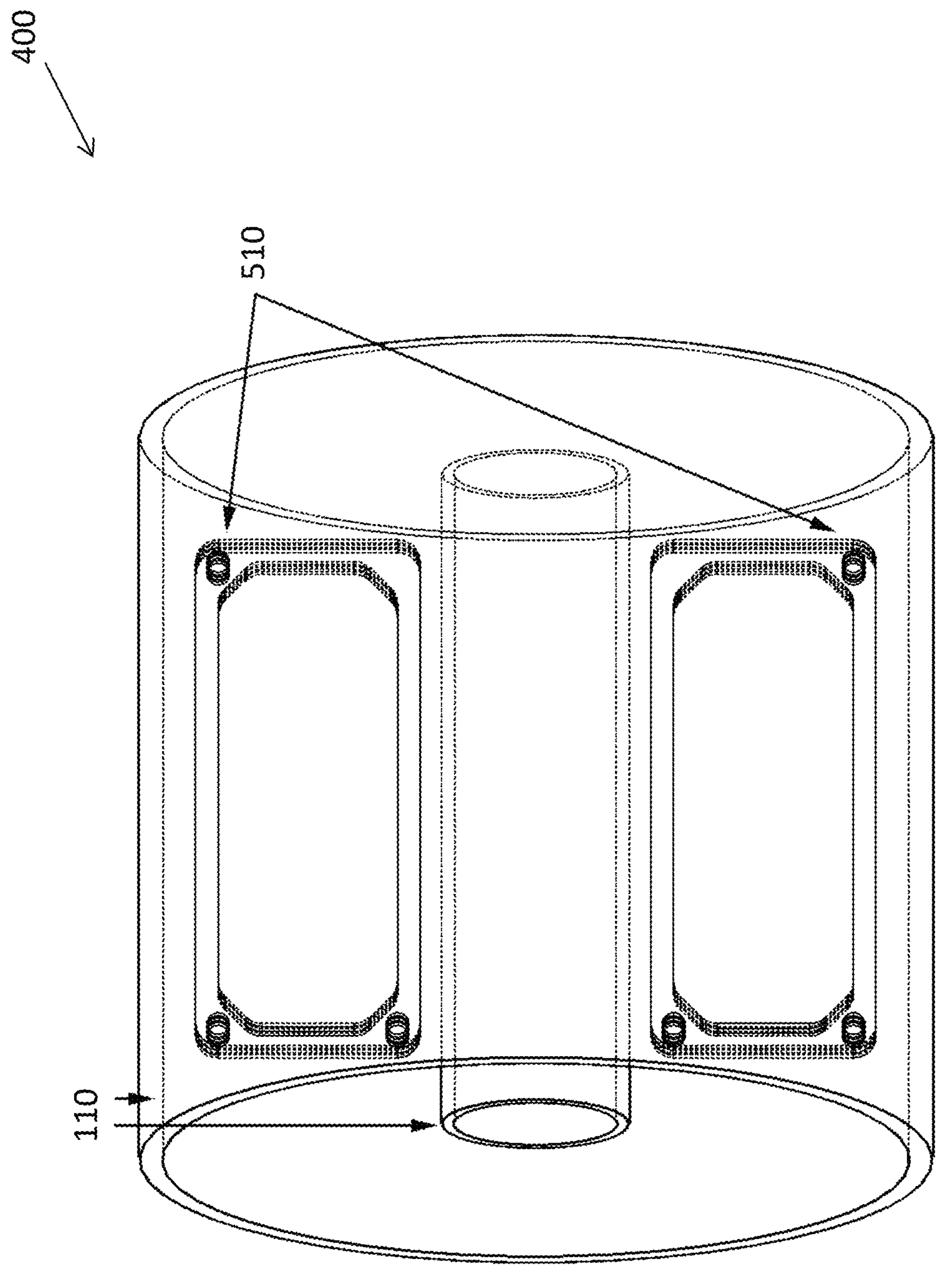
FIGS. 5A-5F are illustrative drawings of electron coil magnet systems using shaping electrodes according to some embodiments.
Figure 5B:
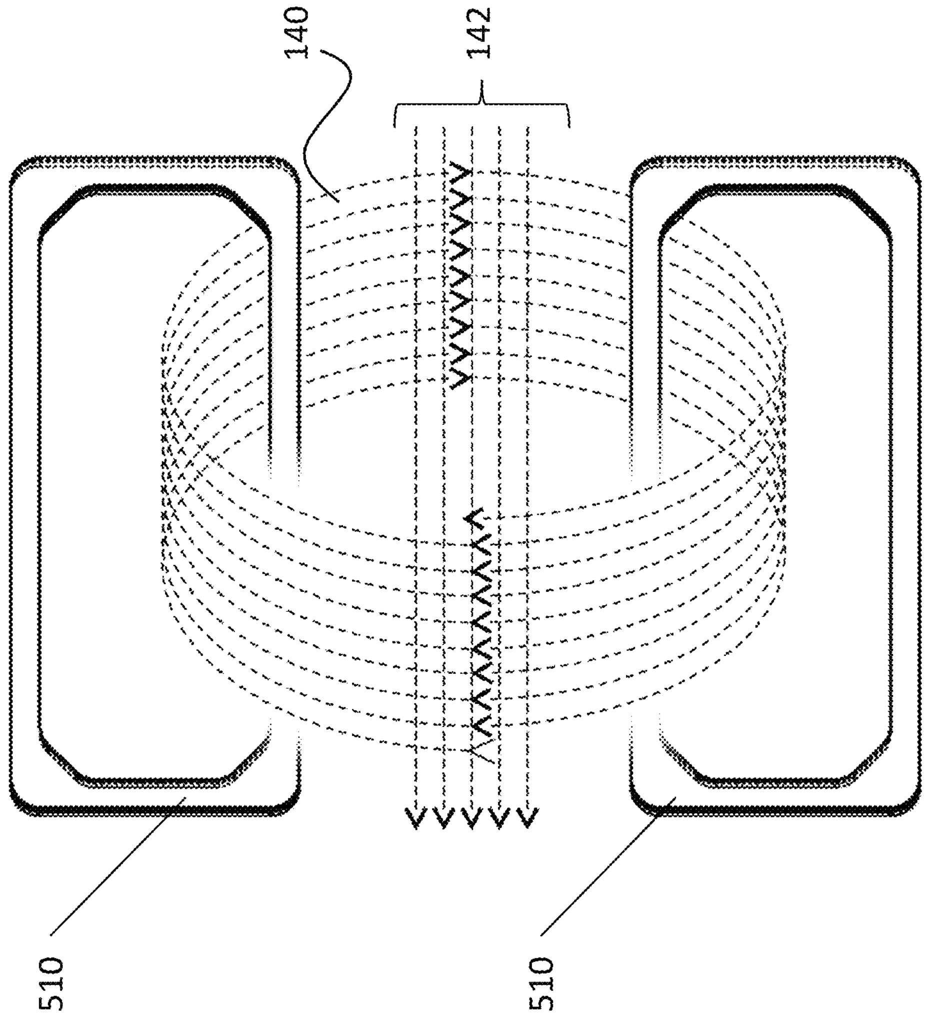

FIGS. 5A-5F are illustrative drawings of the mechanical structure and electrical connections of electron coil magnet systems according to some embodiments. As shown in FIGS. 5A and 5B, an ECMS 400 may include one or more shaping electrode clusters 510 installed inside vacuum container 110. Shaping electrodes clusters 510 are configured to focus the electron flow in electron coil 140, and to compensate for velocity loss of electrons in the flow of the electron coil 140 generated by ECMS 100, 200, 300 or 400. Although two shaping electrodes clusters 510 are shown, it should be appreciated that more or less than two shaping electrode clusters 510 may be provided.

Electric fields between shaping electrodes clusters 510 create forces which direct electrons away from the periphery of shaping electrode 510 and into the center of shaping electrode 510 as a result of electric field vectors pointing towards the center. A dielectric layer or layers positioned in between conducting layers helps to diffuse electric fields that may slow down electrons which exit the shaping electrode 510.

Figure 5C:
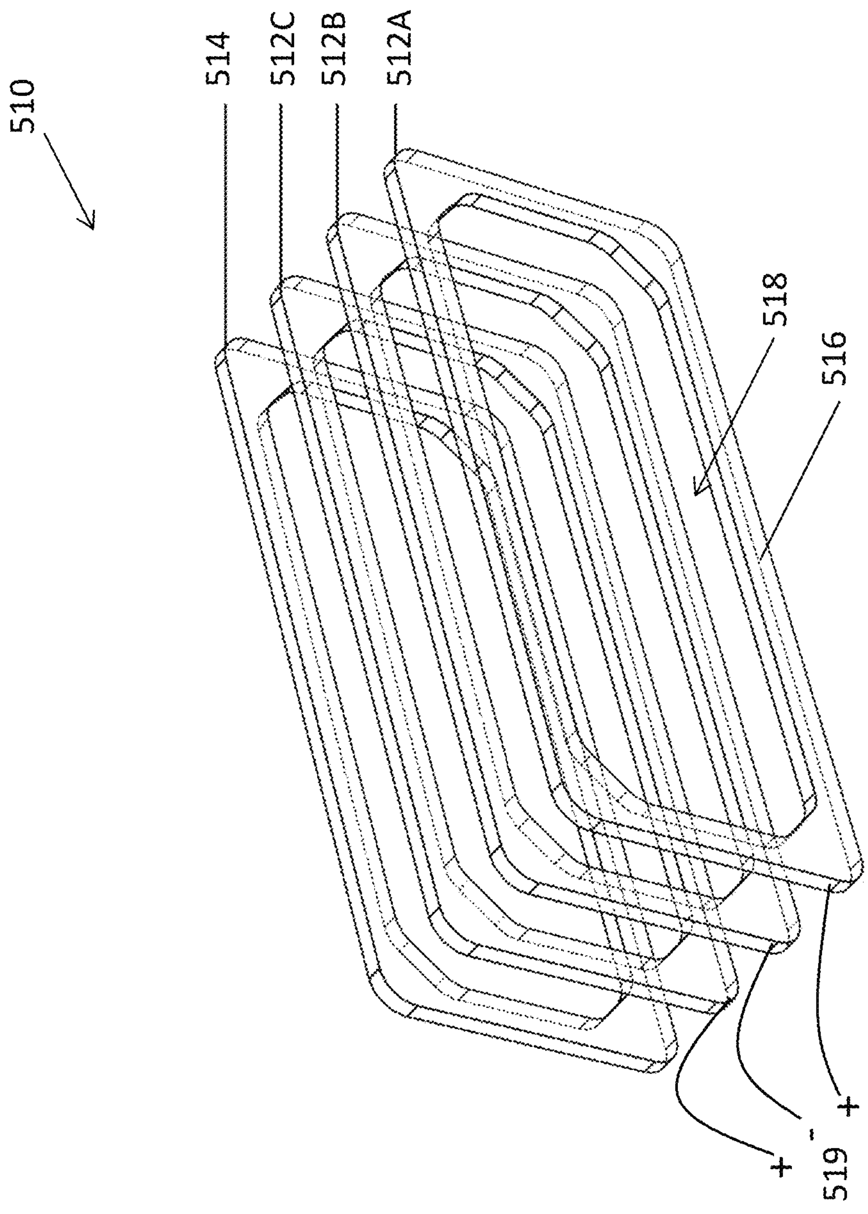

As shown in FIG. 5C, in some embodiments, each shaping electrode cluster 510 may include three conducting layers (512A, 512B and 512C) formed from a conducting material, one or more dielectric layers (514) formed from a dielectric material, and non-conducting spacers (not shown) separating between the conducting layers. In some embodiments, the dielectric material is glass.

In some embodiments, where three conducting layers are provided, the first and third electrodes in a cluster 510 can be smaller in size than the second electrode. The conducting layers of cluster 510 are connected to a power source 519.

It should be appreciated that the polarity and arrangement of connections to power source 519 is illustrative and should not be considered limiting. In some embodiments, the voltage supplied to the second conducting layer in a cluster 510 can be negative relative to voltage supplied to the first and third. In some embodiments, a dielectric layer may be attached to one of the faces of a conducting layer. The position of dielectric layer 514 is illustrative and one or more dielectric layer may be positioned between conductive layers of cluster 510. In some embodiments, each layer may include a frame 516 that defines an aperture 518.

Figure 5D:
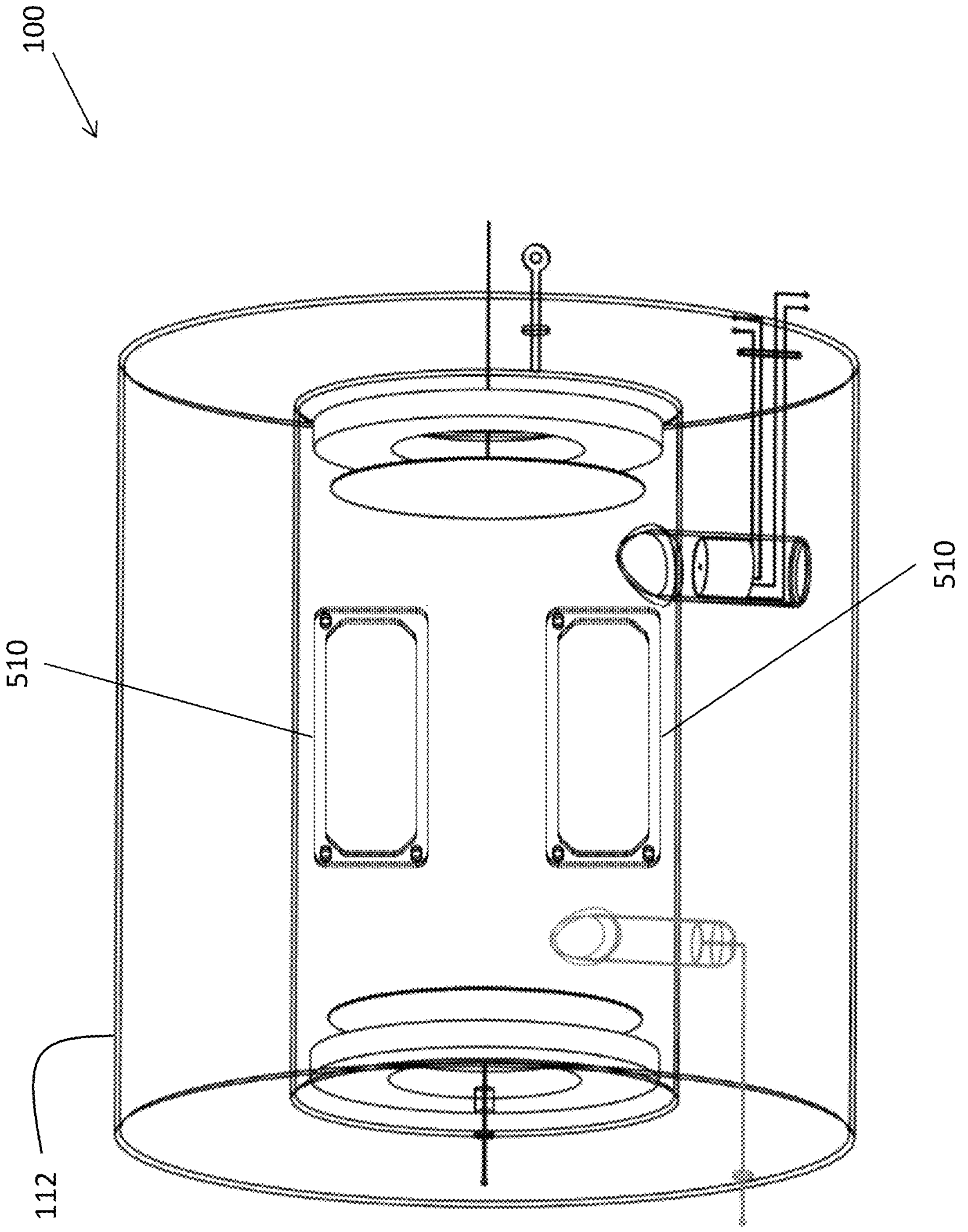
Figure 5E:
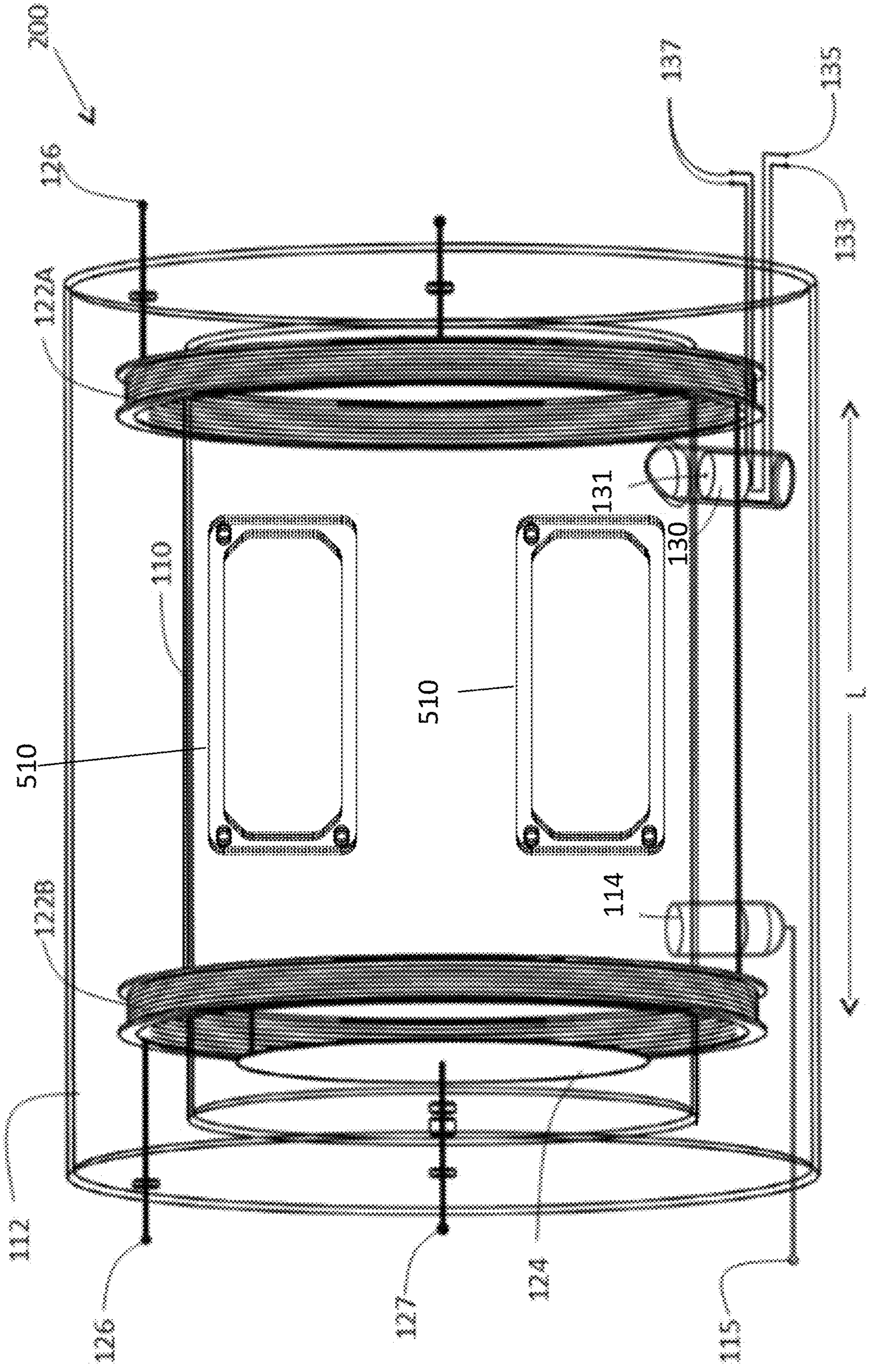
Figure 5F:
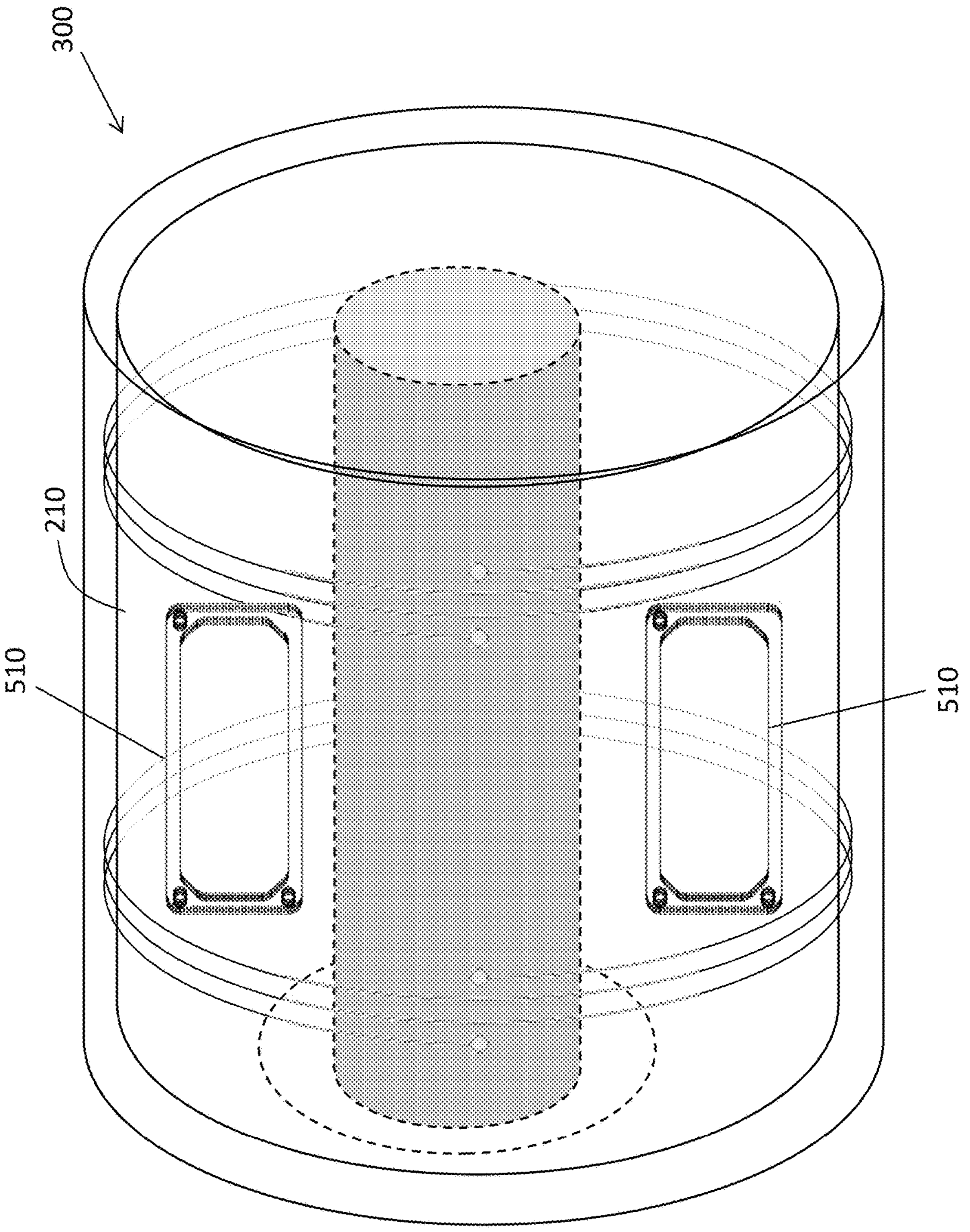

FIG. 5A shows shaping electrodes 510 included in ECMS 400. FIG. 5D shows shaping electrodes 510 included in ECMS 100. FIG. 5E shows shaping electrodes 510 included in ECMS 200. FIG. 5F shows shaping electrodes 510 included in ECMS 300.

Figure 6A:
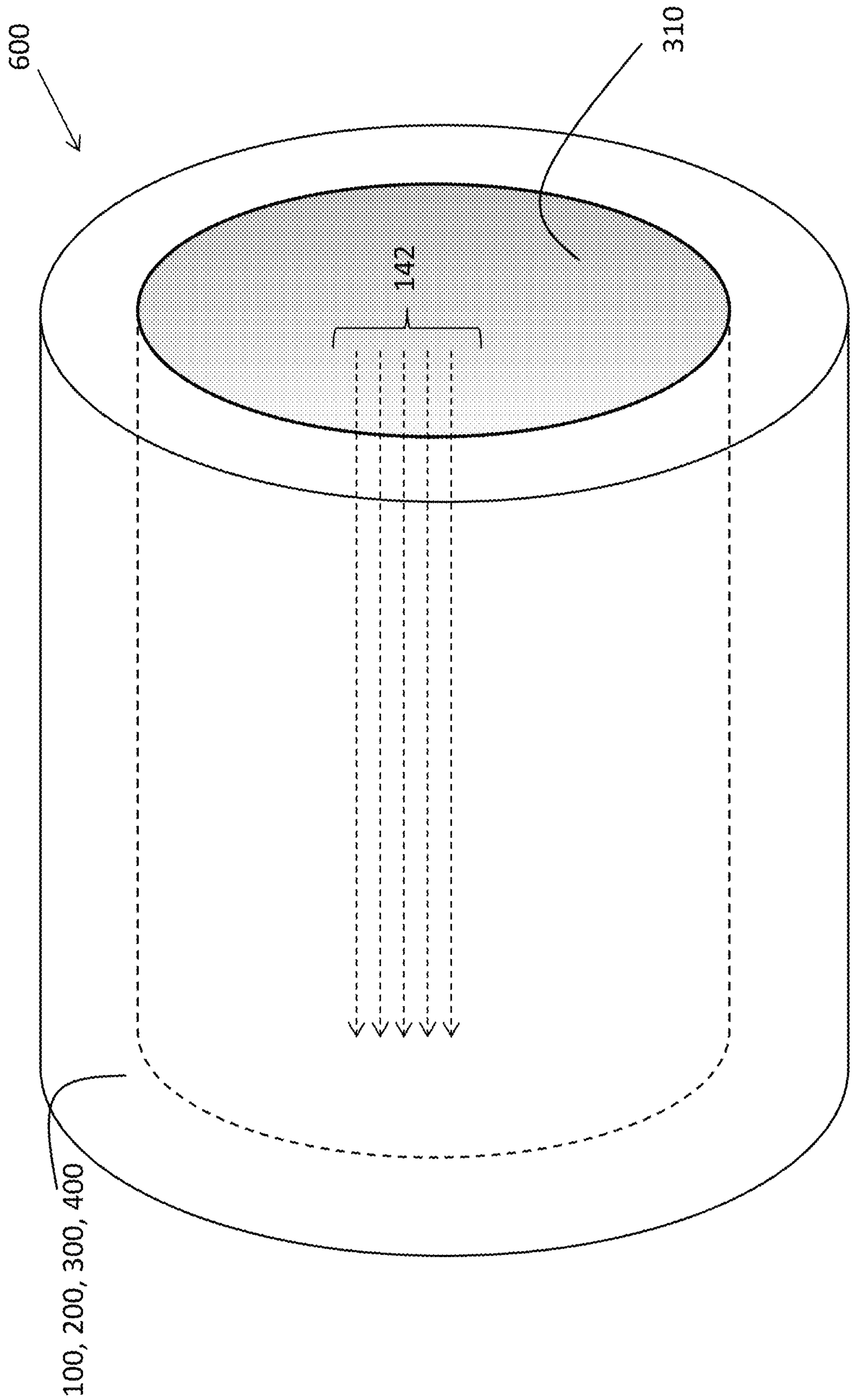
FIG. 6A illustrates schematically a system for generating an electron coil magnet as used in a device with a hollow core according to some embodiments.
Figure 6B:
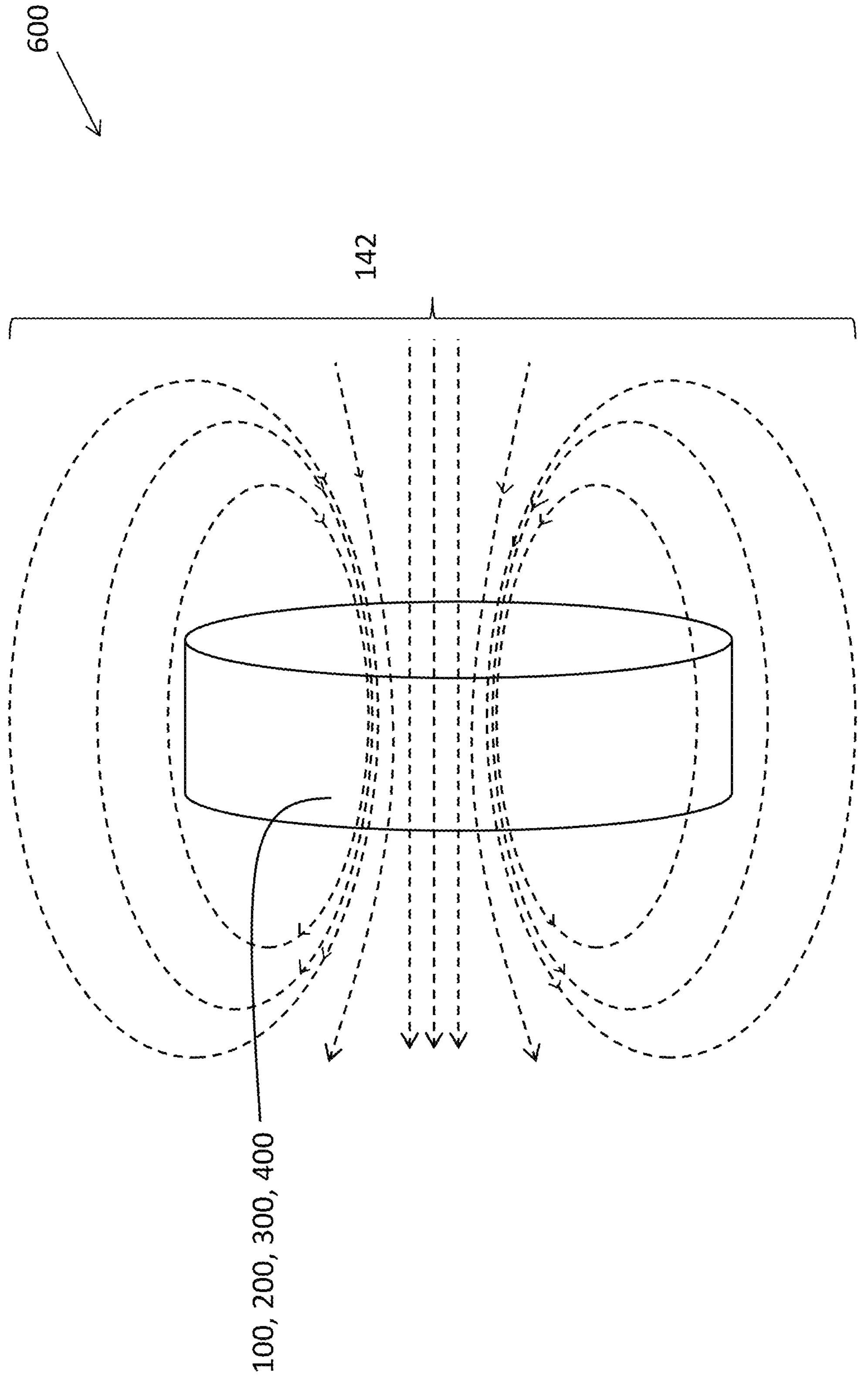
FIG. 6B illustrates schematically a system for generating an electron coil magnet as used in a device according to some embodiments.

Reference is made to FIGS. 6A-6B. FIG. 6A illustrates schematically a system for generating an electron coil magnet as used in a system with a hollow core according to some embodiments. FIG. 6B illustrates schematically a system for generating an electron coil magnet according to some embodiments.

An ECMS device 600 is a device that makes use of the self-generated magnetic field (SGMF) 142 generated by ECMS 100 or ECMS 200 or ECMS 300 or ECMS 400. Non-limiting examples of devices 600 using ECMS 100 or ECMS 200 or ECMS 300 or ECMS 400 include MRI scanners, NMR scanners, radio transceivers, electromagnetic motors/generators, electromechanical solenoids, transformer primary winding and/or secondary winding, relays, loudspeakers, hard disks, scientific instruments, magnetic separation equipment, and so forth.

In the non-limiting embodiment of FIG. 6A, ECMS 100 or ECMS 200 or ECMS 300 or ECMS 400 includes a hollow core 310. Hollow core 310 runs for some or all of the length of ECMS 100 or ECMS 200 or ECMS 300 or ECMS 400 for insertion of subjects or items related to device 600. Non-limiting examples of ECMS devices 600 utilizing hollow core 310 include MRI scanners where a subject may be inserted into hollow core 310 for the purpose of scanning.

In the non-limiting embodiment of FIG. 6B, ECMS 100 or ECMS 200 or ECMS 300 or ECMS 400 may be configured such that SGMF 142 extends beyond ECMS 100 or ECMS 200 or ECMS 300 or ECMS 400 for use by ECMS devices 600. Non-limiting examples of ECMS devices 600 utilizing the structure of FIG. 6B include electromagnetic motors/generators, electromechanical solenoids, relays, loudspeakers, hard disks, scientific instruments, magnetic separation equipment, and so forth.

In the claims or specification of the present application, unless otherwise stated, adjectives such as "substantially" and "about" modifying a condition or relationship characteristic of a feature or features of an embodiment of the invention, are understood to mean that the condition or characteristic is defined to within tolerances that are acceptable for operation of the embodiment for an application for which it is intended.

For the sake of clarity, the term "substantially" is used herein to imply the possibility of variations in values within an acceptable range. According to one example, the term "substantially" used herein should be interpreted to imply possible variation of up to 10% over or under any specified value. According to another example, the term "substantially" used herein should be interpreted to imply possible variation of up to 5% over or under any specified value. According to a further example, the term "substantially" used herein should be interpreted to imply possible variation of up to 2.5% over or under any specified value.

It should be understood that where the claims or specification refer to "a" or "an" element, such reference is not to be construed as there being only one of that element.

In the description and claims of the present application, each of the verbs, "include" "include" and "have", and conjugates thereof, are used to indicate that the object or objects of the verb are not necessarily a complete listing of components, elements or parts of the subject or subjects of the verb.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the invention. Further combinations of the above features are also considered to be within the scope of some embodiments of the invention.

While this disclosure describes a limited number of embodiments, it will be appreciated that many variations, modifications and other applications of such embodiments may be made. The disclosure is to be understood as not limited by the specific embodiments described herein, but only by the scope of the appended claims.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present disclosure involves performing or completing certain selected tasks or steps manually, automatically, or a combination thereof. Moreover, according to actual instrumentation and equipment of preferred embodiments of the method and system of the present disclosure, several selected steps could be implemented by hardware or by software on any operating system of any firmware or a combination thereof. For example, as hardware, selected steps of the disclosure could be implemented as a chip or a circuit. As software, selected steps of the disclosure could be implemented as a plurality of software instructions being executed by a computer using any suitable operating system. In any case, selected steps of the method and system of the disclosure could be described as being performed by a data processor, such as a computing platform for executing a plurality of instructions.

Although the present disclosure is described with regard to a "computing device", a "computer", or "mobile device", it should be noted that optionally any device featuring a data processor and the ability to execute one or more instructions may be described as a computer, including but not limited to any type of personal computer (PC), a server, a distributed server, a virtual server, a cloud computing platform, a cellular telephone, an IP telephone, a smartphone, or a PDA (personal digital assistant). Any two or more of such devices in communication with each other may optionally form a "computer network".

What is claimed is:

1. A magnet system comprising:

a) a supplied magnetic field producer configured for creating a supplied magnetic field (SMF) or a supplied radial electric field producer configured for creating a supplied radial electric field (SREF);

b) a vacuum container for containing a vacuum; and c) an electron gun positioned so as to fire electrons into the SMF or the SREF in a direction substantially perpendicular to the SMF or the SREF such that the electrons fired out of the electron gun form and maintain an electron coil in the vacuum, wherein the electron coil creates a self-generated magnetic field (SGMF).

2. The system of claim 1, wherein the SMF producer comprises fixed magnets or coils.

3. The system of claim 1, wherein the SREF producer comprises a shielding container.

4. The system of claim 1, further comprising one or more shaping electrode clusters wherein each shaping electrode cluster includes a plurality of conducting layers and one or more dielectric layers.

5. The system of claim 1, further comprising one or more repelling plates for repulsion of fired electrons away from the repelling plates.

6. The system of claim 1, further comprising a controller and a second electron gun, wherein the controller is configured for changing the magnetic polarity of the SGMF.

7. The system of claim 1, further comprising a collector electrode for collection of fired electrons.

8. The system of claim 1, further comprising a shielding container.

9. The system of claim 1, wherein the electron gun emission mechanism is one of thermionic, photocathode, field emission, or plasma source.

10. The system of claim 1, wherein the electron gun comprises an electron gun output and wherein the electron gun output is positioned within the SMF or the SREF or outside of the SMF or the SREF.

11. The system of claim 1, wherein the electron gun comprises one or more of an electron velocity control, an angle control and/or a focus control.

12. The system of claim 11, wherein the controller can control a parameter selected from the list consisting of an angle of insertion of the electrons from electron gun, an insertion velocity of the electrons from electron gun, a focus control of the electron gun and a combination thereof.

13. The system of claim 1, further comprising a metallic core, wherein the metallic core comprises one or more sections and wherein the metallic core comprises a material with high magnetic permeability and/or a high magnetic saturation level.

14. The system of claim 13, wherein the metallic core comprises an alloy such as mu-metal.

15. The system of claim 1, configured for use in one or more of: MRI scanners, radio transceivers, electromagnetic motors, electromagnetic generators, electromechanical solenoids, transformer primary windings transformer secondary winding, relays, loudspeakers, hard disks, scientific instruments, or magnetic separation equipment.

16. A method for creating a self-generated magnetic field comprising:

a) providing a supplied magnetic field producer configured for creating a supplied magnetic field (SMF) or a supplied radial electric field producer configured for creating a supplied radial electric field (SREF);

b) providing an electron gun positioned so as to fire electrons into the SMF or the SREF in a direction substantially perpendicular to the SMF or the SREF; and c) firing the electrons into the SMF or the SREF within a vacuum to create an electron coil, wherein the electron coil creates the self-generated magnetic field.

17. A method for creating a self-generated magnetic field comprising:

a) providing a supplied magnetic field (SMF) or a supplied radial electric field (SREF);

b) firing charged particles into a vacuum within the SMF or the SREF to create a charged particle coil, wherein the charged particle coil creates a self-generated magnetic field.

* * * * *